United States Patent
Kim et al.

(10) Patent No.: US 10,503,276 B2
(45) Date of Patent: Dec. 10, 2019

(54) ELECTRONIC DEVICE AND A CONTROL METHOD THEREOF

(71) Applicant: KOREA ELECTRONICS TECHNOLOGY INSTITUTE, Seongnam-si, Gyeonggi-do (KR)

(72) Inventors: Kunnyun Kim, Yongin-si (KR); Wion Hyo Kim, Yongin-si (KR); Yeonhwa Kwak, Seoul (KR); Kwang Bum Park, Yongin-si (KR)

(73) Assignee: KOREA ELECTRONICS TECHNOLOGY INSTITUTE, Seongnam-si, Gyeonggi-do (KR)

( * ) Notice: Subject to any disclaimer, the term of this patent is extended or adjusted under 35 U.S.C. 154(b) by 0 days.

(21) Appl. No.: 15/038,432

(22) PCT Filed: Dec. 20, 2013

(86) PCT No.: PCT/KR2013/011918
§ 371 (c)(1),
(2) Date: May 20, 2016

(87) PCT Pub. No.: WO2015/093667
PCT Pub. Date: Jun. 25, 2015

(65) Prior Publication Data
US 2016/0299579 A1    Oct. 13, 2016

(30) Foreign Application Priority Data

Dec. 19, 2013 (KR) .................. 10-2013-0159361
Dec. 19, 2013 (KR) .................. 10-2013-0159362

(51) Int. Cl.
*G06F 3/0346* (2013.01)
*G06F 3/0487* (2013.01)
(Continued)

(52) U.S. Cl.
CPC ............ *G06F 3/0346* (2013.01); *G06F 3/017* (2013.01); *G06F 3/0487* (2013.01); *G09G 5/006* (2013.01); *G09G 2380/02* (2013.01)

(58) Field of Classification Search
CPC ...... G06F 3/0346; G06F 3/017; G06F 3/0487; G06F 3/041; G06F 3/0414; G06F 3/0416; G09G 2380/02; G09G 5/006
See application file for complete search history.

(56) References Cited

U.S. PATENT DOCUMENTS

| 8,543,166 | B2 * | 9/2013 | Choi ................ G06F 1/1601 345/156 |
| 9,372,532 | B2 * | 6/2016 | Tziortzis .................. G06F 3/01 |

(Continued)

FOREIGN PATENT DOCUMENTS

| EP | 2613244 A2 | 7/2013 |
| EP | 2648066 A2 | 10/2013 |

(Continued)

OTHER PUBLICATIONS

English Translation of KR 20130132679.*
(Continued)

*Primary Examiner* — Patrick N Edouard
*Assistant Examiner* — Eboni N Giles
(74) *Attorney, Agent, or Firm* — Knobbe Martens Olson & Bear LLP

(57) ABSTRACT

An electronic device according to an embodiment of the present invention may include: a flexible display; a bending sensing unit configured to sense a first bending and a second bending of the flexible display; and a control unit configured to execute a first function based on a first sensing result of the first bending from the bending sensing unit, and execute a second function based on a second sensing result of the second bending from the bending sensing unit, in which, (Continued)

when the first bending and the second bending correspond to a first predetermined condition, the control unit executes a third function based on the first bending and the second bending sensed by the bending sensing unit.

9 Claims, 26 Drawing Sheets

(51) Int. Cl.
*G06F 3/01* (2006.01)
*G09G 5/00* (2006.01)

(56) References Cited

U.S. PATENT DOCUMENTS

| | | | |
|---|---|---|---|
| 9,489,913 B2* | 11/2016 | Kwak | G06F 3/0487 |
| 9,672,796 B2* | 6/2017 | Son | G09G 5/40 |
| 2008/0303782 A1 | 12/2008 | Grant et al. | |
| 2012/0105358 A1 | 5/2012 | Momeyer et al. | |
| 2012/0133621 A1* | 5/2012 | Kim | H04M 1/0206 |
| | | | 345/204 |
| 2012/0289290 A1 | 11/2012 | Chae et al. | |
| 2012/0320081 A1 | 12/2012 | Kim et al. | |
| 2013/0120302 A1 | 5/2013 | Kang et al. | |
| 2013/0169520 A1* | 7/2013 | Cho | G06F 3/0488 |
| | | | 345/156 |
| 2013/0215088 A1 | 8/2013 | Son | |
| 2013/0265257 A1* | 10/2013 | Jung | G06F 3/0412 |
| | | | 345/173 |
| 2013/0285922 A1 | 10/2013 | Alberth, Jr. | |
| 2013/0285933 A1* | 10/2013 | Sim | G06F 3/04883 |
| | | | 345/173 |
| 2013/0296000 A1* | 11/2013 | Park | G09G 3/001 |
| | | | 455/566 |
| 2013/0321264 A1* | 12/2013 | Park | G06F 3/01 |
| | | | 345/156 |
| 2014/0002355 A1 | 1/2014 | Lee et al. | |
| 2014/0028596 A1 | 1/2014 | Seo et al. | |
| 2014/0054438 A1* | 2/2014 | Yun | G06F 1/1652 |
| | | | 248/550 |
| 2014/0098028 A1 | 4/2014 | Kwak et al. | |
| 2014/0101560 A1 | 4/2014 | Kwak et al. | |
| 2014/0320425 A1 | 10/2014 | Jeong et al. | |
| 2014/0347287 A1 | 11/2014 | Lee et al. | |
| 2014/0375596 A1 | 12/2014 | Kim et al. | |
| 2016/0266788 A1 | 9/2016 | Park et al. | |
| 2016/0291762 A1 | 10/2016 | Kim et al. | |
| 2016/0299578 A1 | 10/2016 | Kim et al. | |
| 2017/0262070 A1 | 9/2017 | Kwak et al. | |

FOREIGN PATENT DOCUMENTS

| | | |
|---|---|---|
| KR | 10-2010-0015231 A | 2/2010 |
| KR | 10-2010-0018883 A | 2/2010 |
| KR | 10-2010-0023326 A | 3/2010 |
| KR | 10-2010-0041733 A | 4/2010 |
| KR | 10-2010-0107377 A | 10/2010 |
| KR | 10-2011-0063410 A | 6/2011 |
| KR | 10-2012-0056512 A | 6/2012 |
| KR | 10-2010-0138618 A | 12/2012 |
| KR | 10-2012-0138618 A | 12/2012 |
| KR | 10-2013-0030727 A | 3/2013 |
| KR | 10-2013-0085528 A | 7/2013 |
| KR | 10-2013-0113901 A | 10/2013 |
| KR | 10-2013-0120817 A | 11/2013 |
| KR | 10-2013-0132679 A | 12/2013 |
| KR | 10-2013-0135648 A1 | 12/2013 |

OTHER PUBLICATIONS

English Translation of KR 20130085528.*
International Search Report dated Sep. 30, 2014 for International Application No. PCT/KR2013/011918, filed Dec. 20, 2013.
Final Office Action in KR Application No. 10-2014-0166661, dated Jul. 28, 2016 in 4 pages.
International Search Report dated Sep. 22, 2014 for International Application No. PCT/KR2013/011917, filed Dec. 20, 2013.
International Search Report dated Sep. 22, 2014 for International Application No. PCT/KR2013/011916, filed Dec. 20, 2013.
Office Action in KR Application No. 10-2013-0159356, dated Mar. 31, 2015 in 4 pages.
Office Action in KR Application No. 10-2013-0159359, dated Apr. 30, 2015 in 4 pages.
Office Action received in U.S. Appl. No. 15/038,406, dated Jul. 13, 2017.
Office Action received in U.S. Appl. No. 15/038,406, dated Mar. 14, 2018.
Notice of Allowance in KR Application No. 10-2013-0159356, dated Sep. 26, 2015 in 2 pages.
Final Office Action received in U.S. Appl. No. 15/038,406, dated Apr. 18, 2019.
Final Office Action received in U.S. Appl. No. 15/038,406, dated Oct. 9, 2018.
Notice of Allowance in KR Application No. 10-2014-0166659, dated Feb. 22, 2019 in 2 pages.
Office Action in KR Application No. 10-2014-0166659, dated Jun. 29, 2018 in 4 pages.
Office Action received in U.S. Appl. No. 15/038,429, dated Jan. 25, 2019.

* cited by examiner

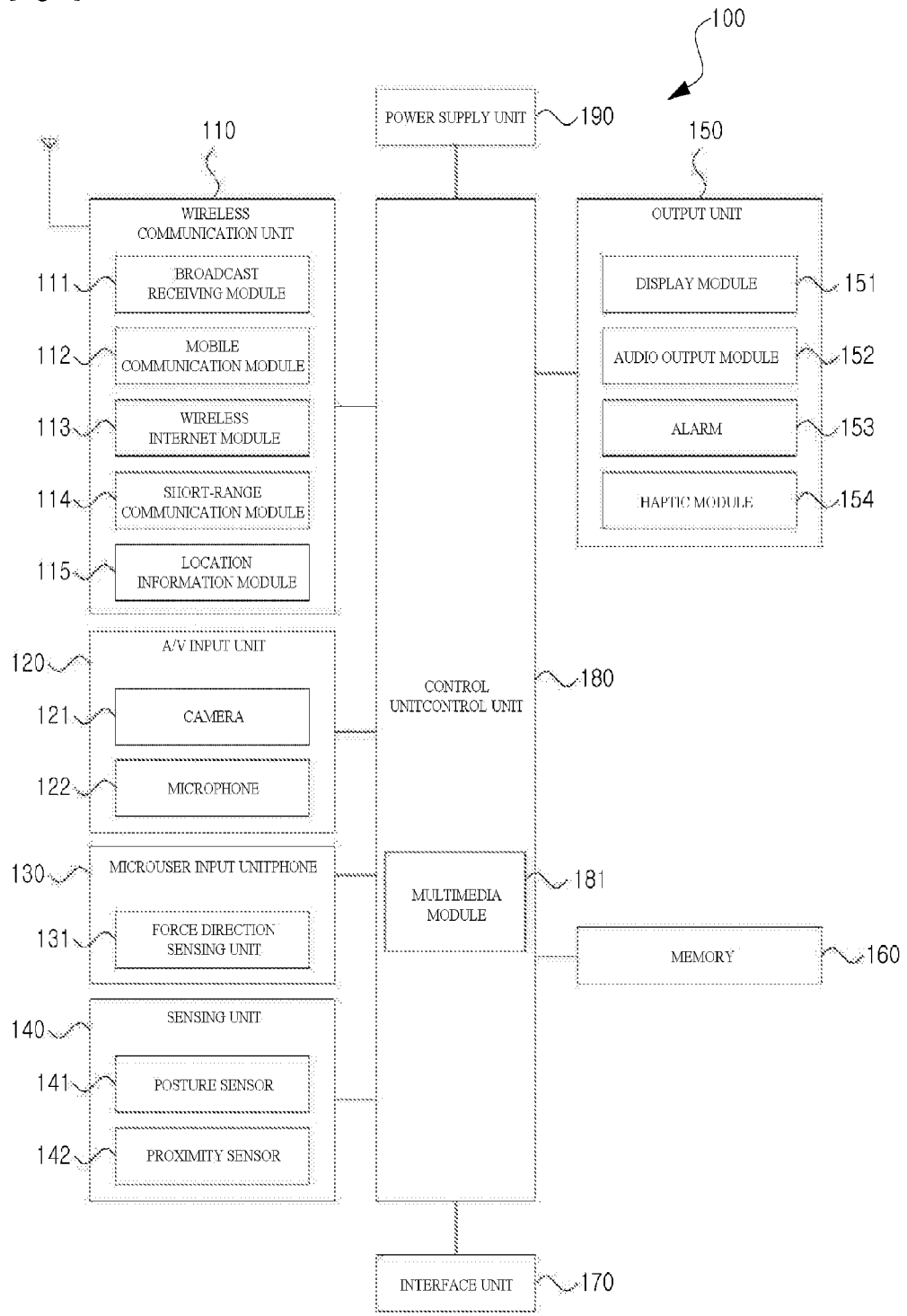
[Fig. 1]

[Fig. 2]
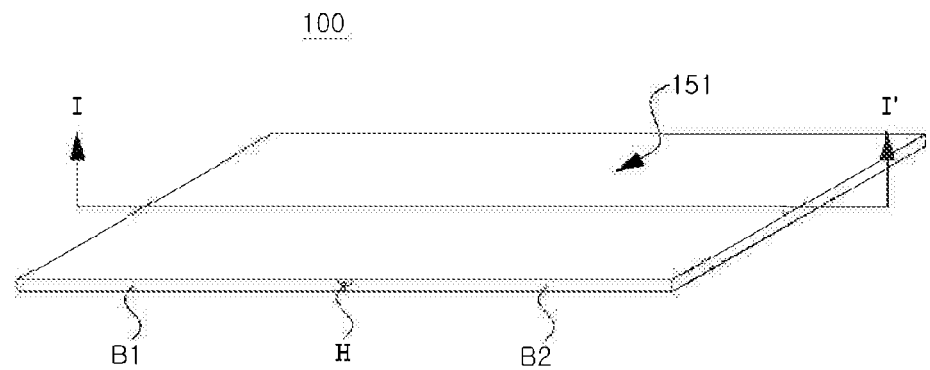
(a)
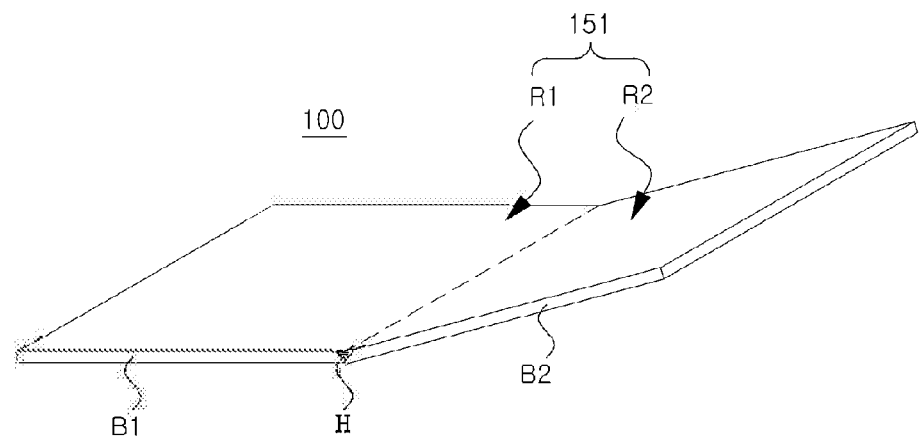
(b)
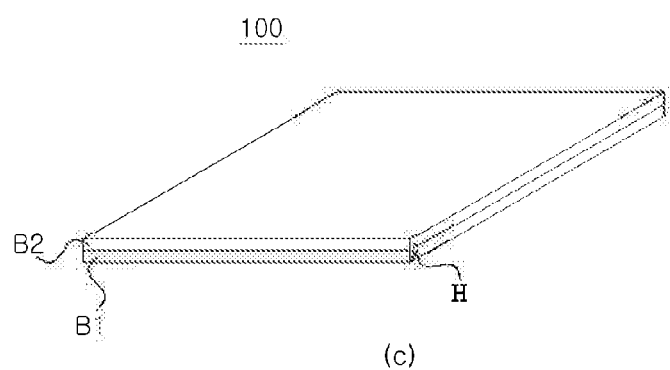
(c)

[Fig. 3]
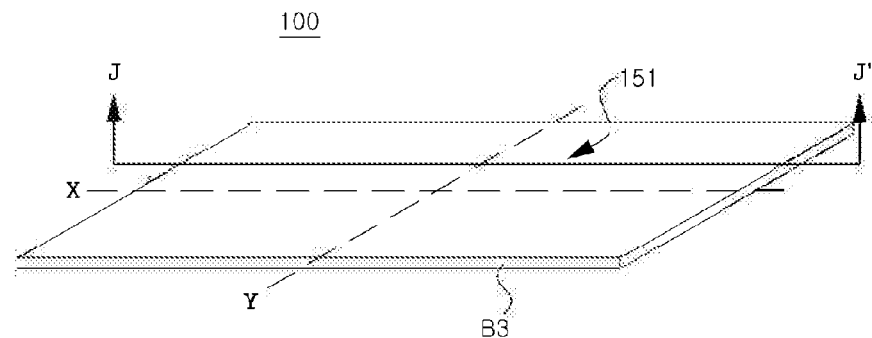
(a)
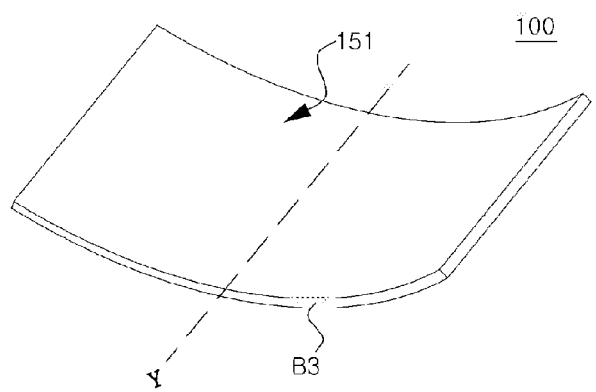
(b)
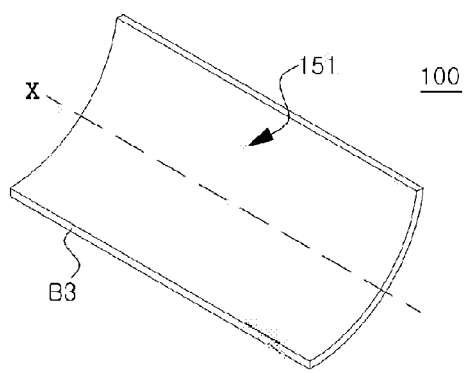
(b)

[Fig. 4]
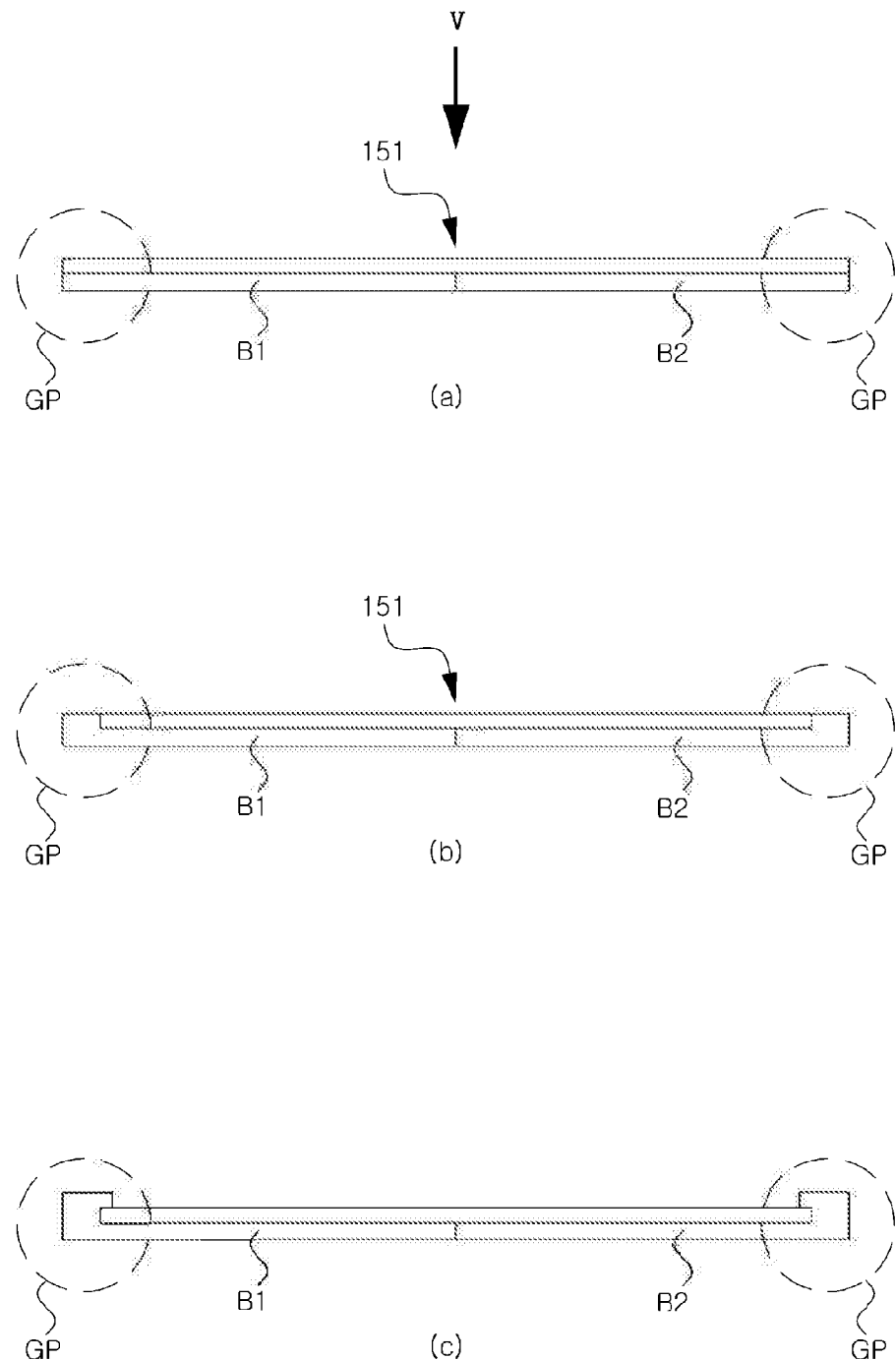

[Fig. 5]
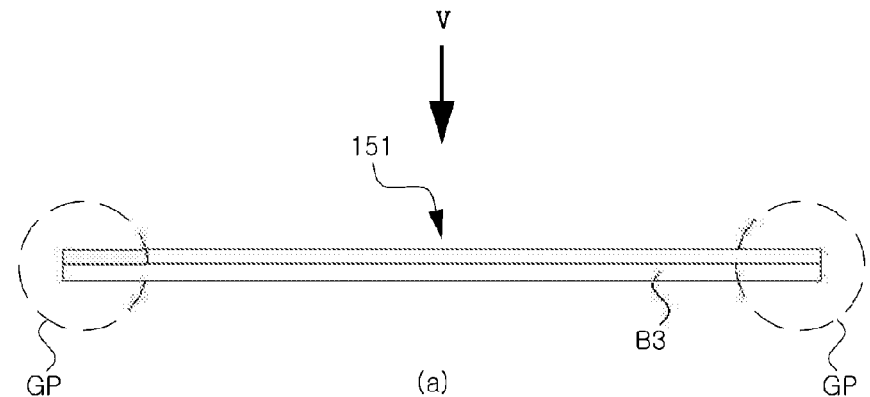
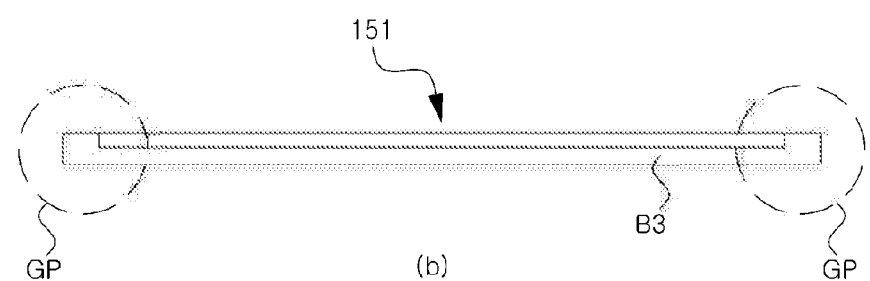
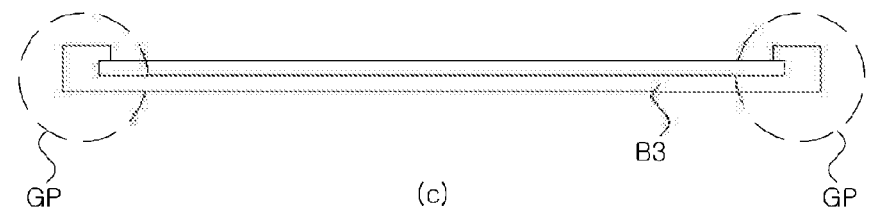

[Fig. 6]
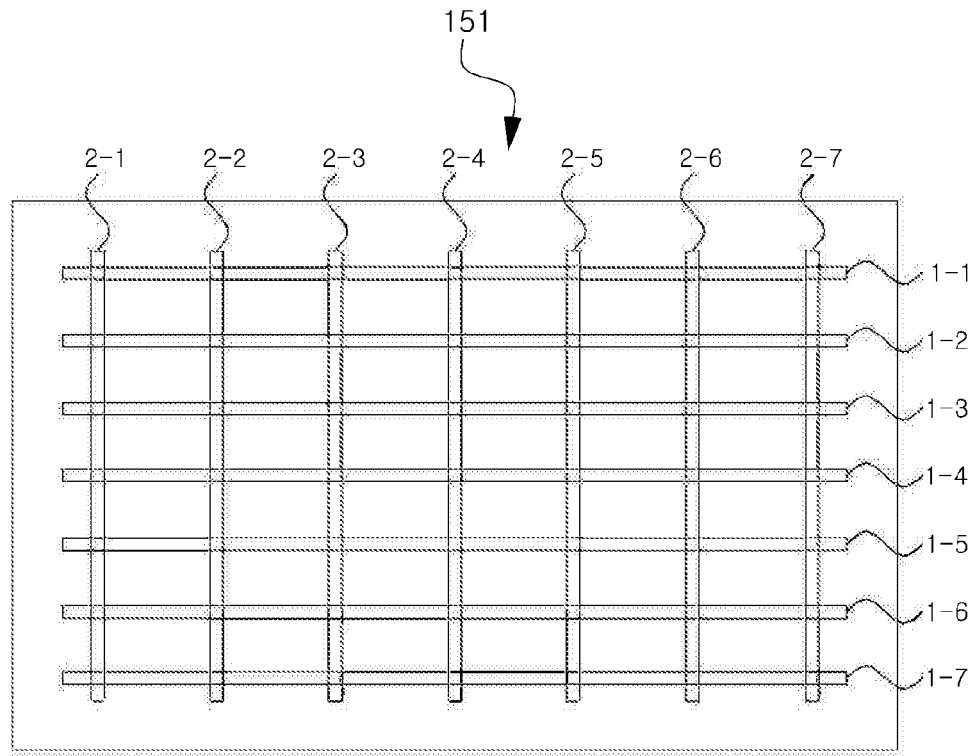
[Fig. 7]
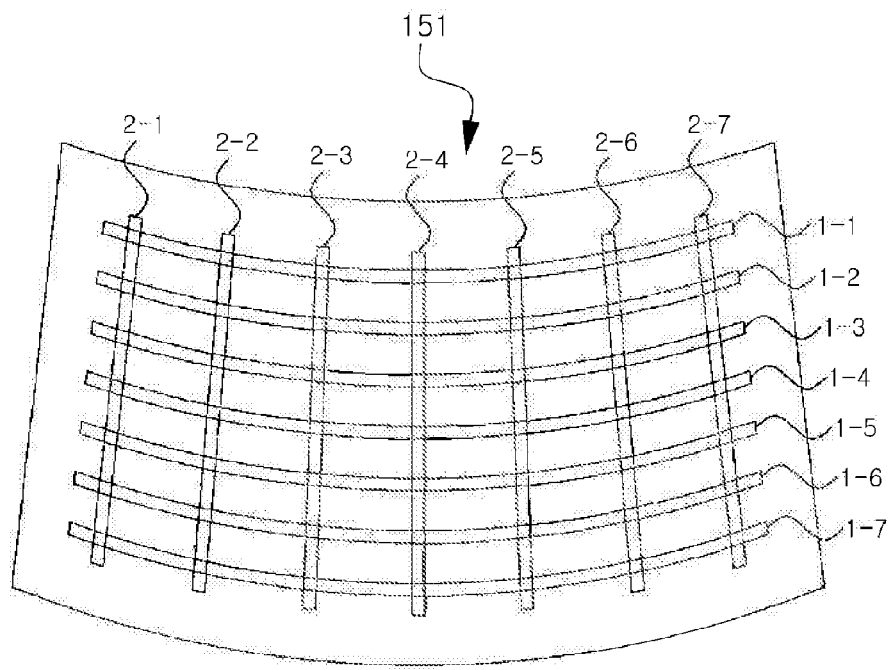

[Fig. 8]
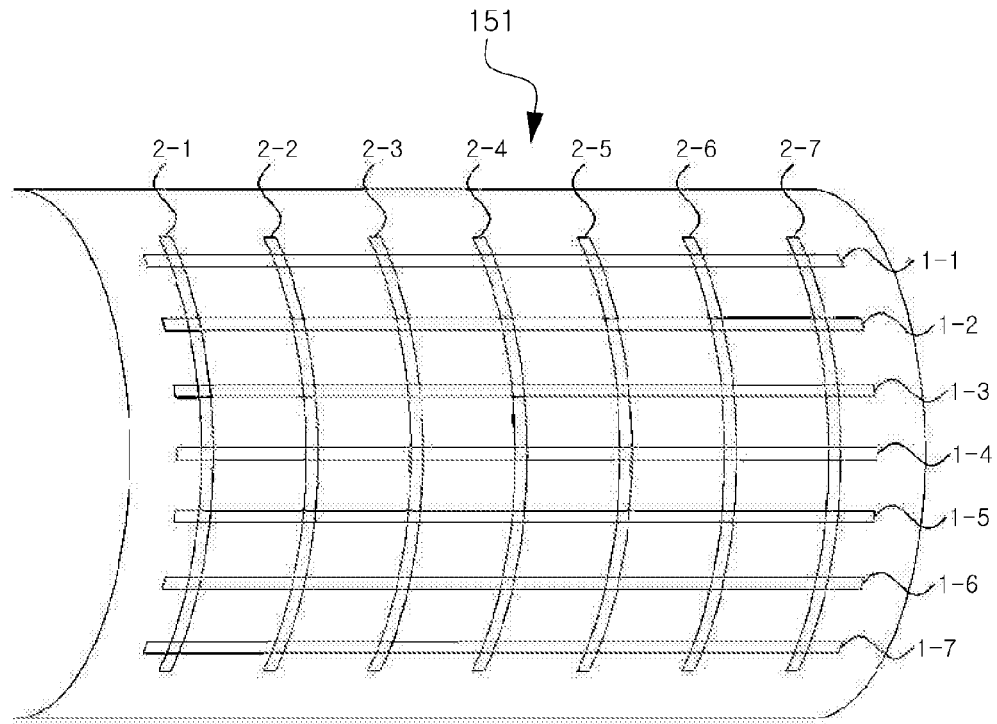
[Fig. 9]
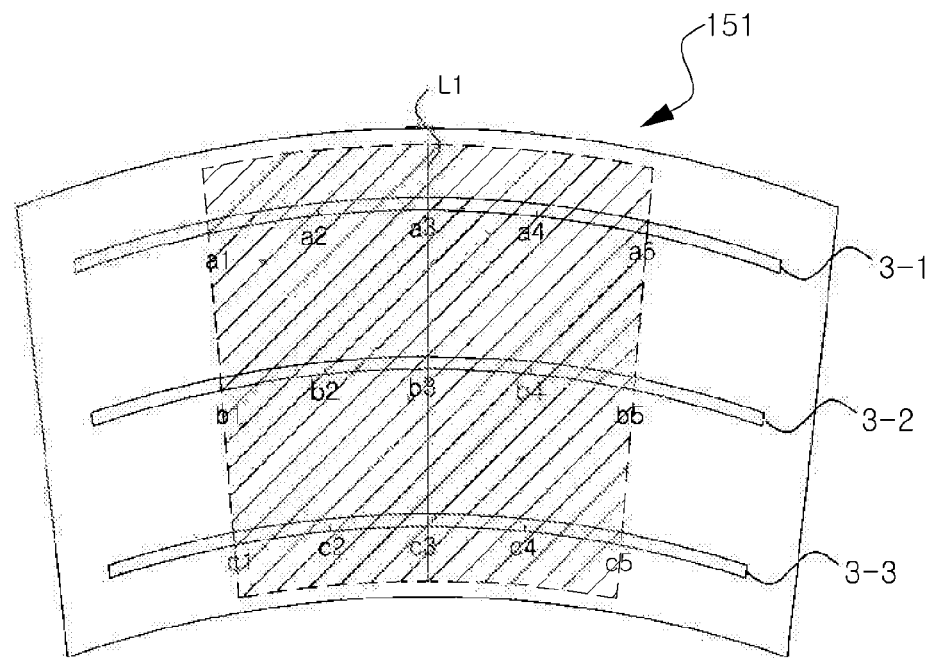

[Fig. 10]
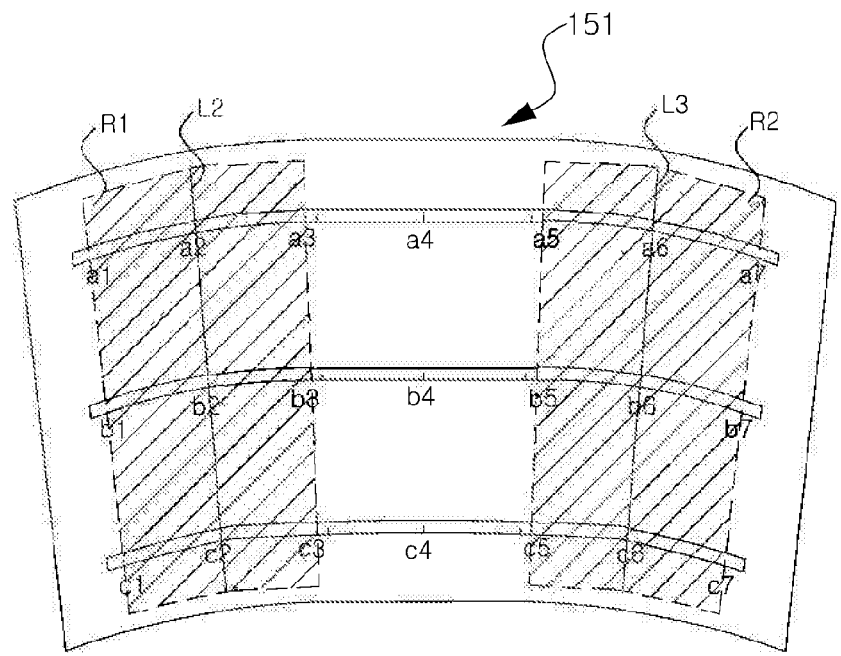
[Fig. 11]
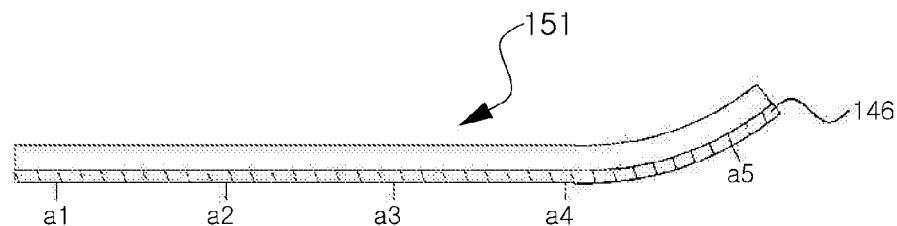
[Fig. 12]
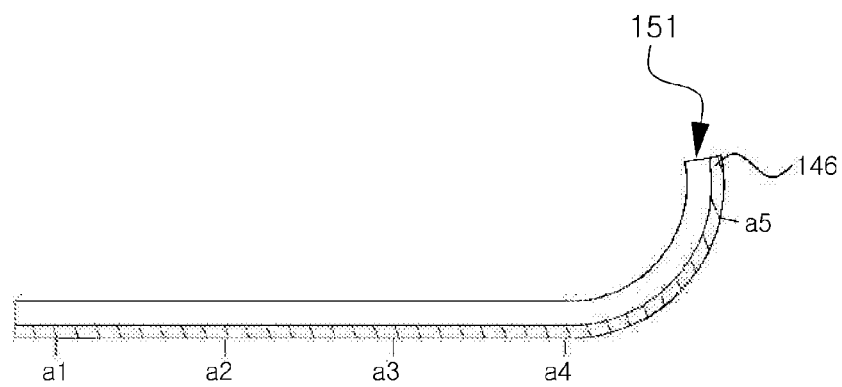

[Fig. 13]
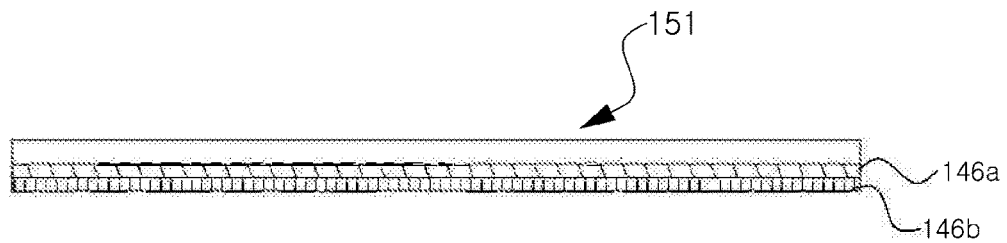
[Fig. 14]
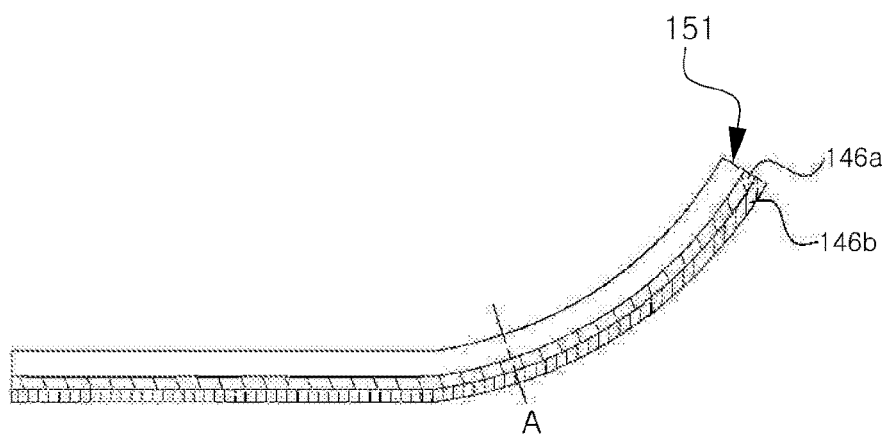
[Fig. 15]
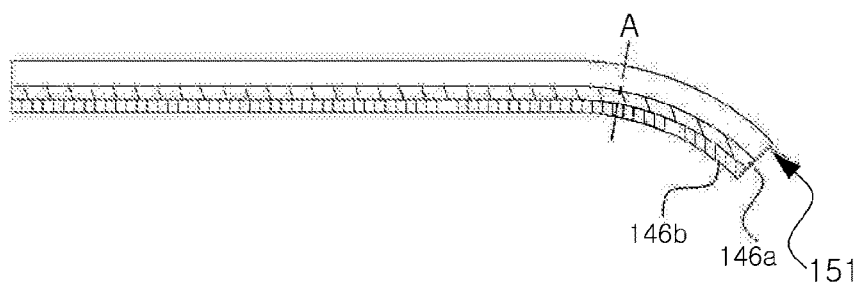
[Fig. 16]
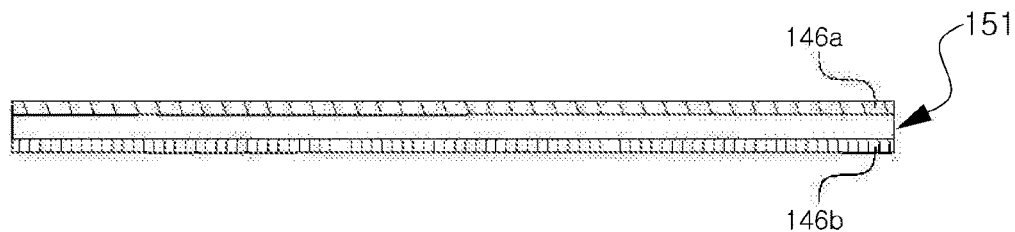

[Fig. 17]
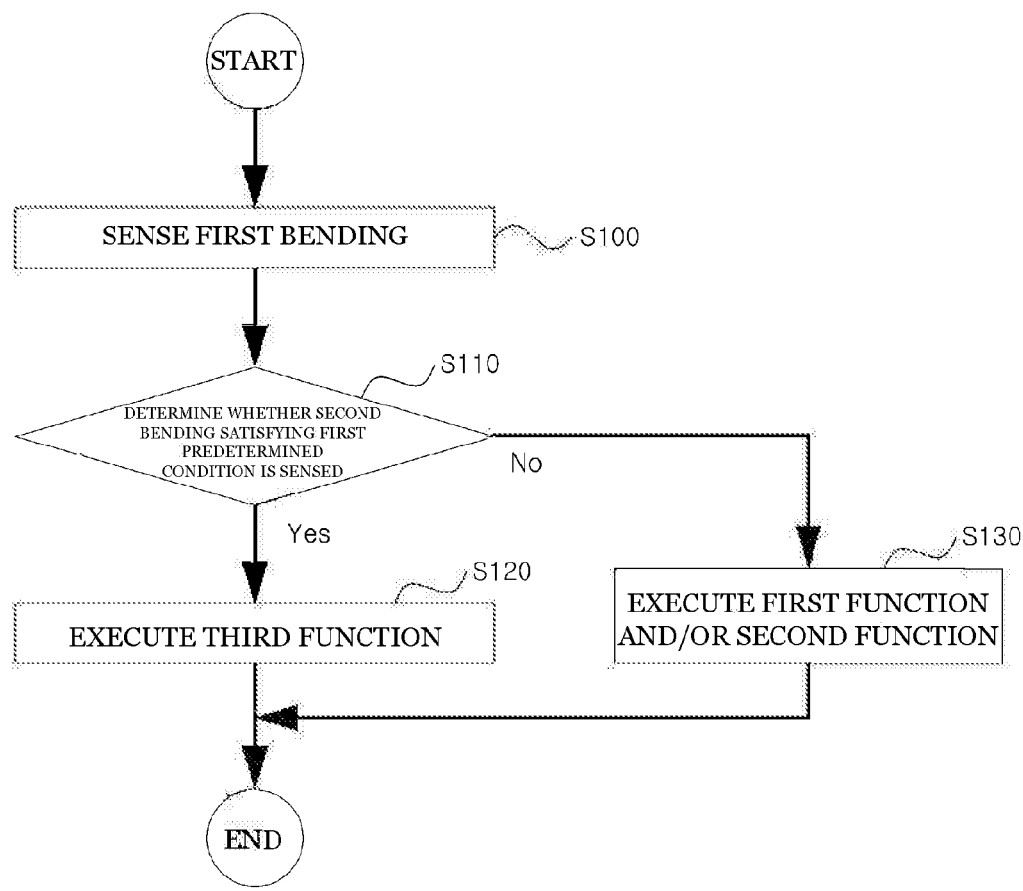

[Fig. 18]
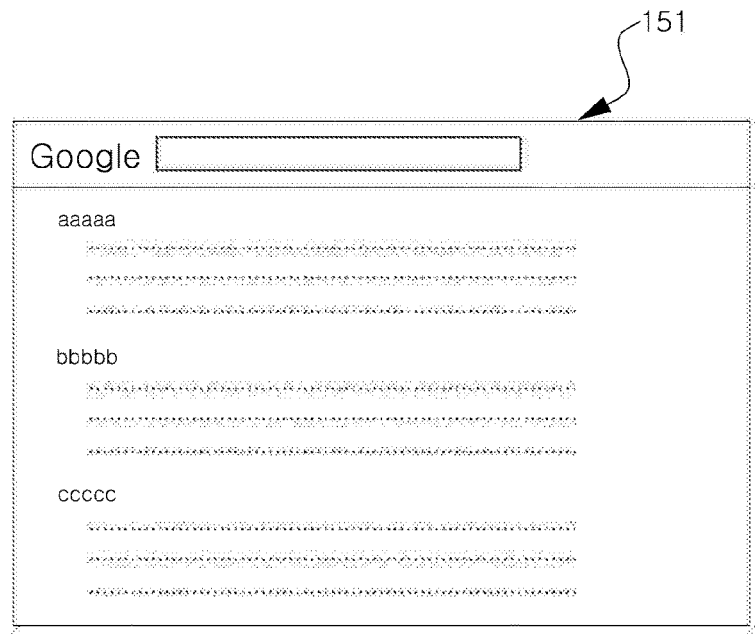
[Fig. 19]
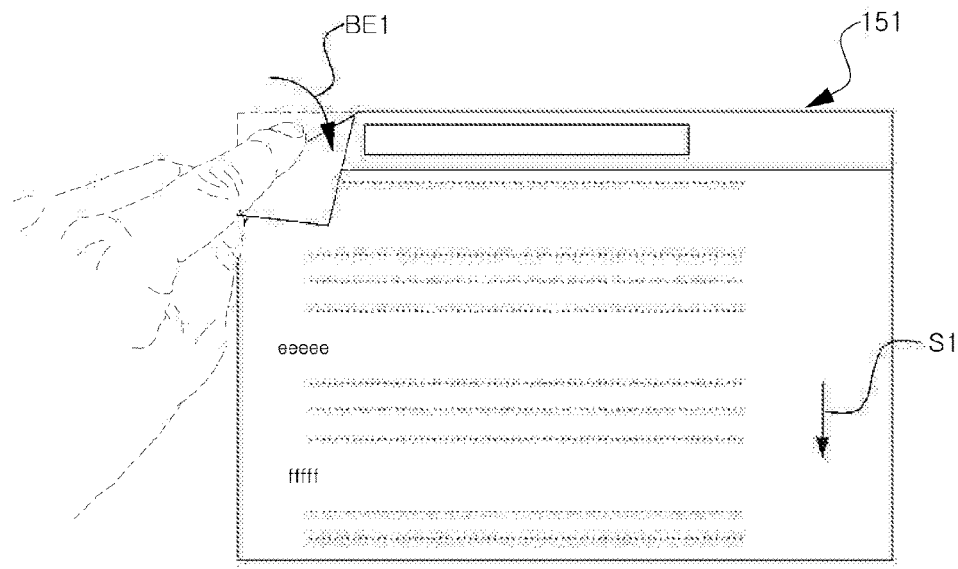

[Fig. 20]
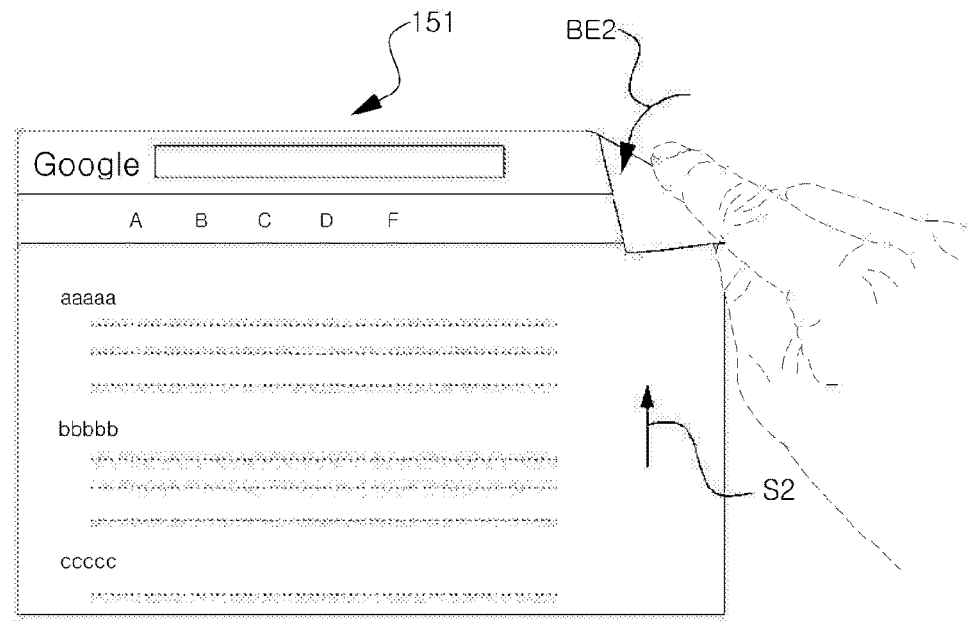
[Fig. 21]
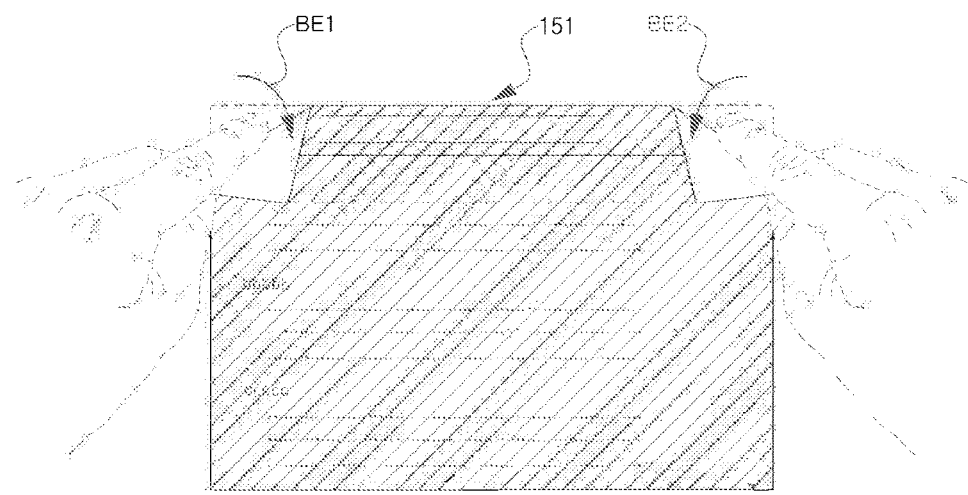

[Fig. 22]
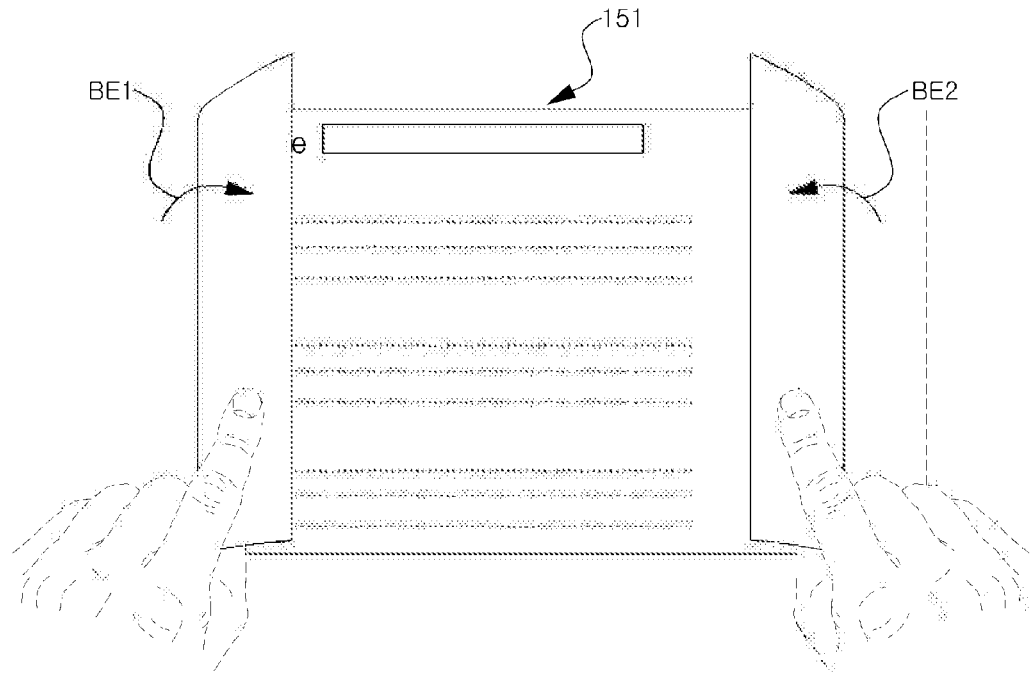
[Fig. 23]
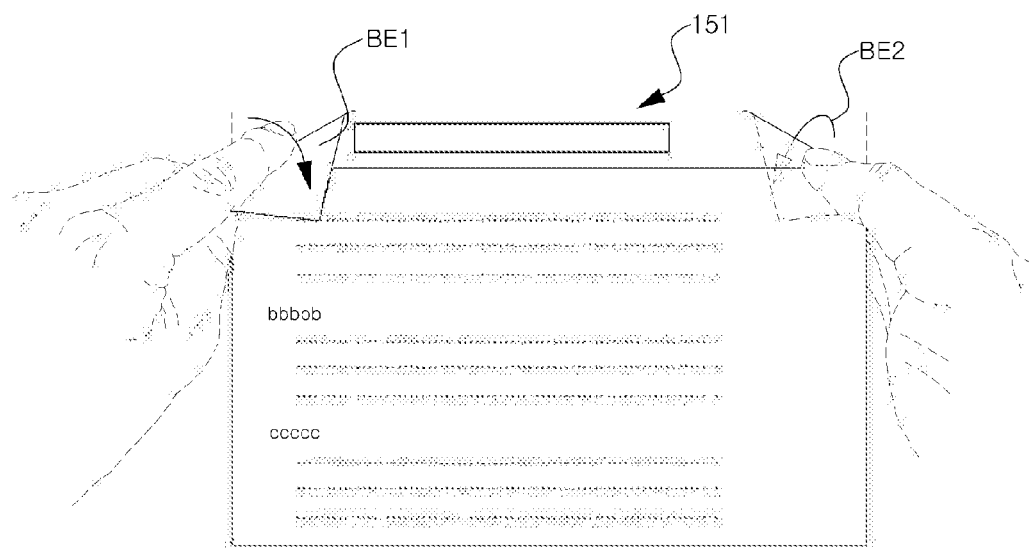

[Fig. 24]
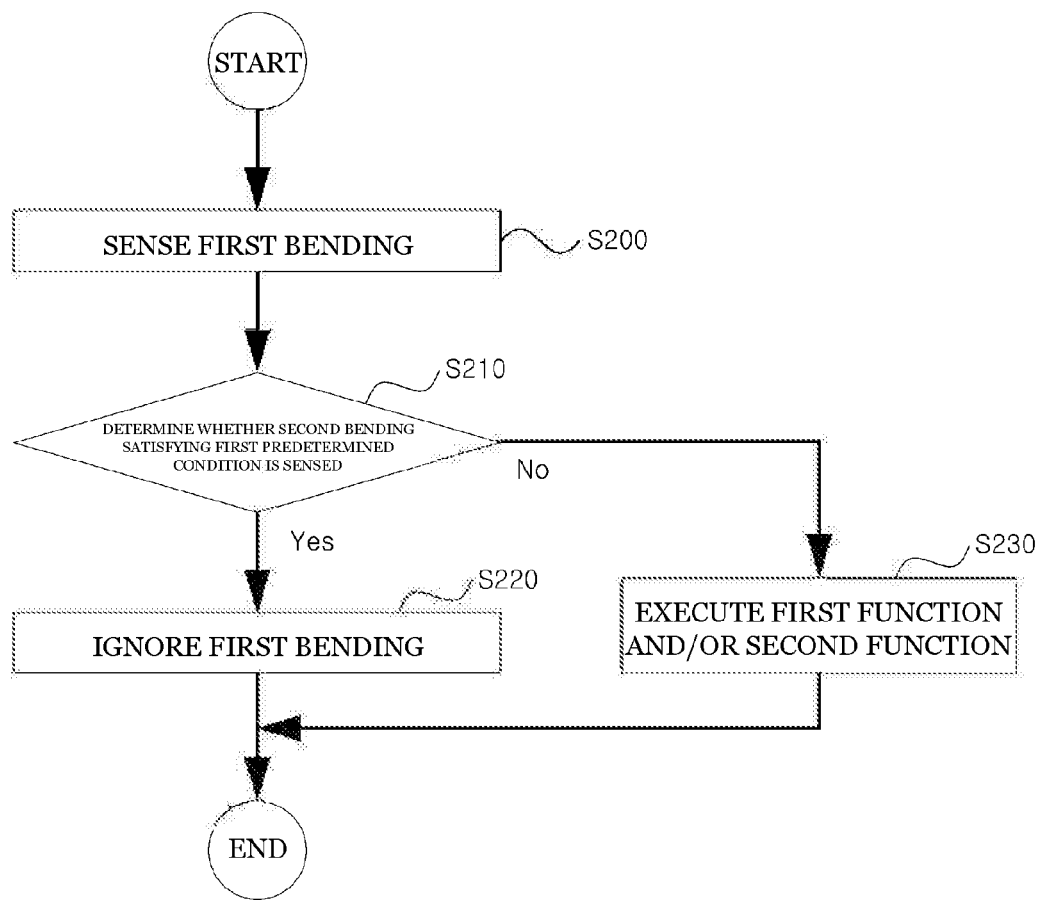

[Fig. 25]
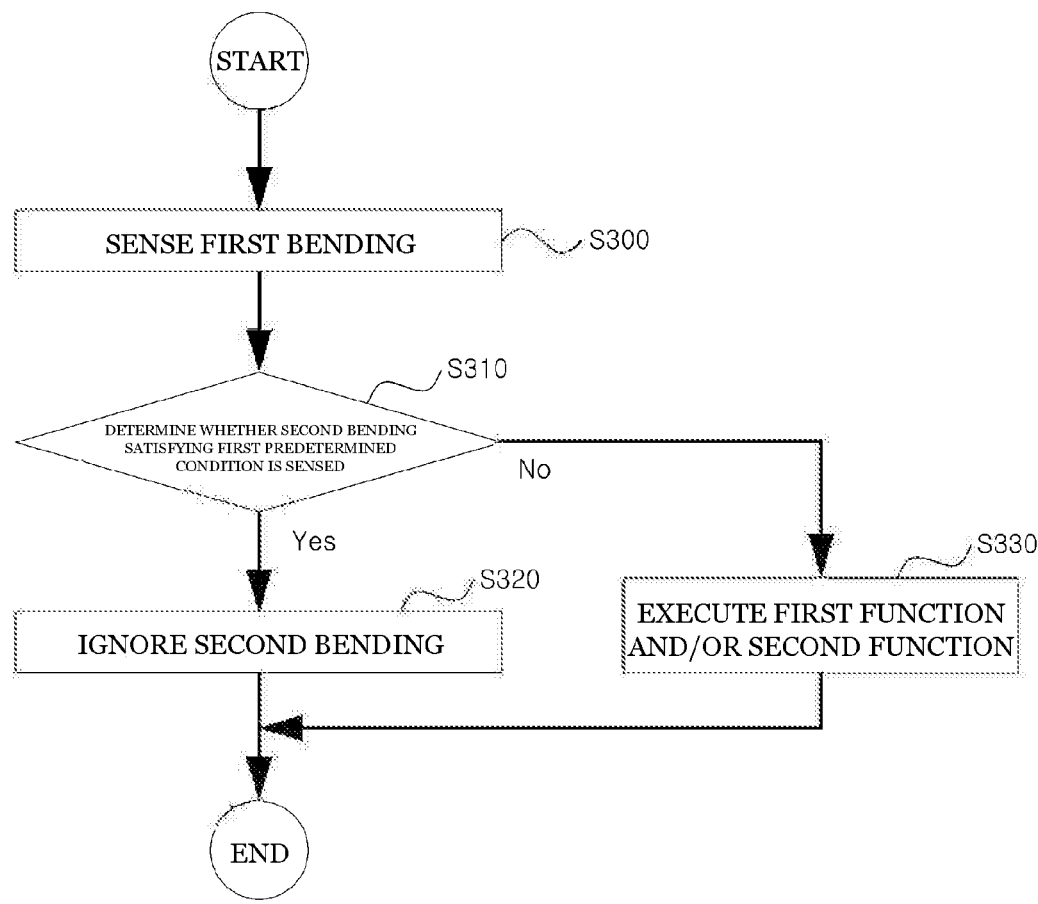

[Fig. 26]
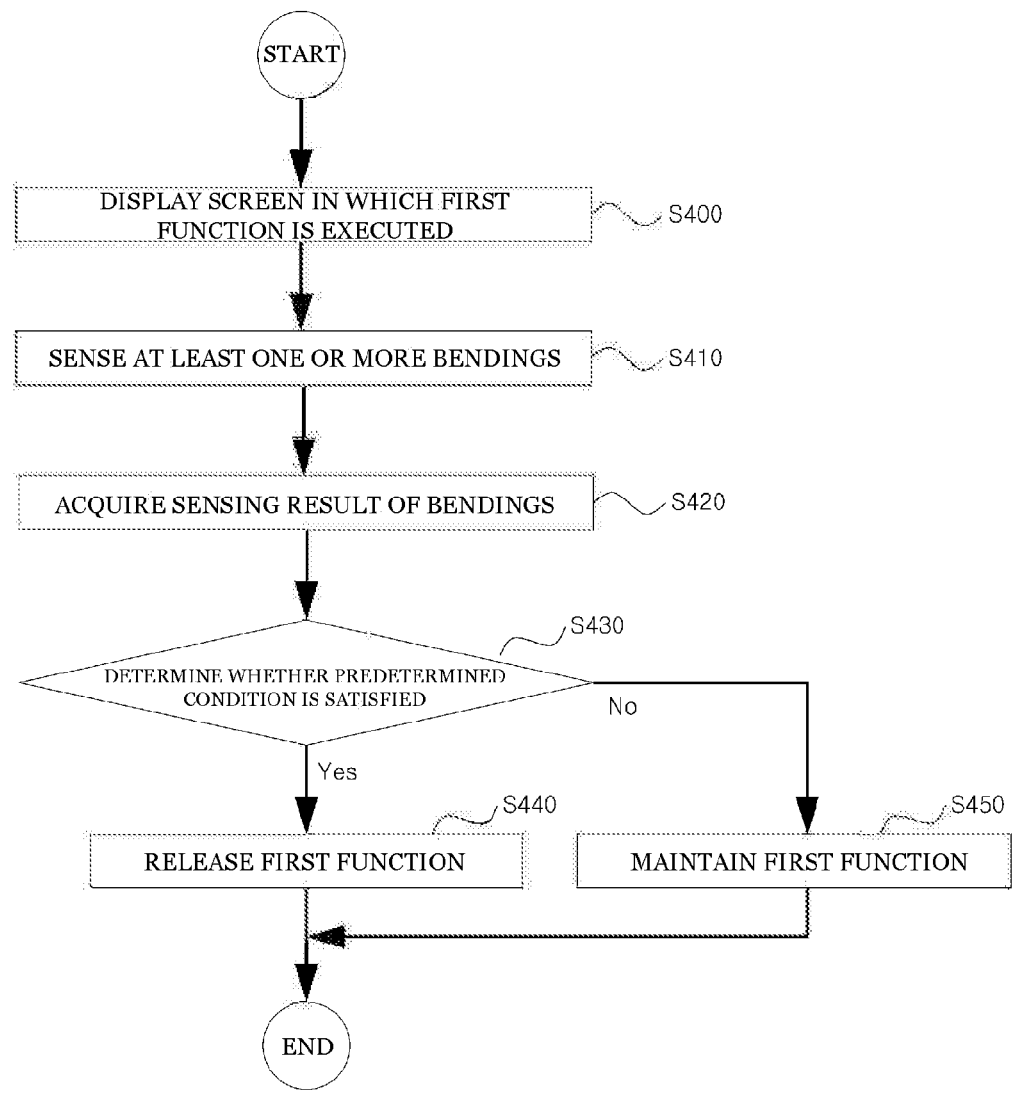

[Fig. 27]
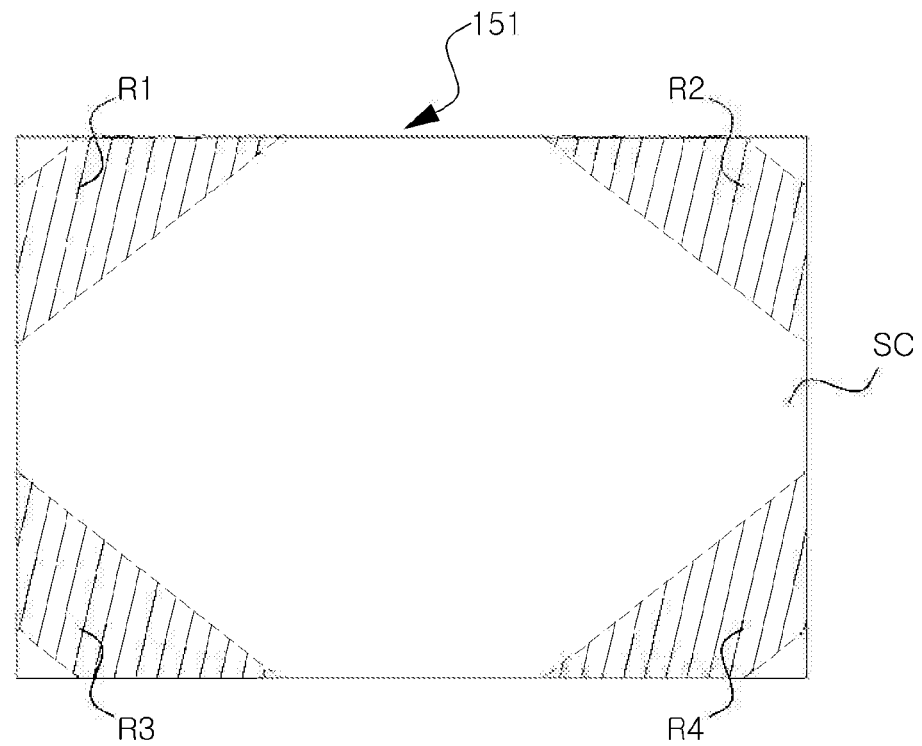
[Fig. 28]
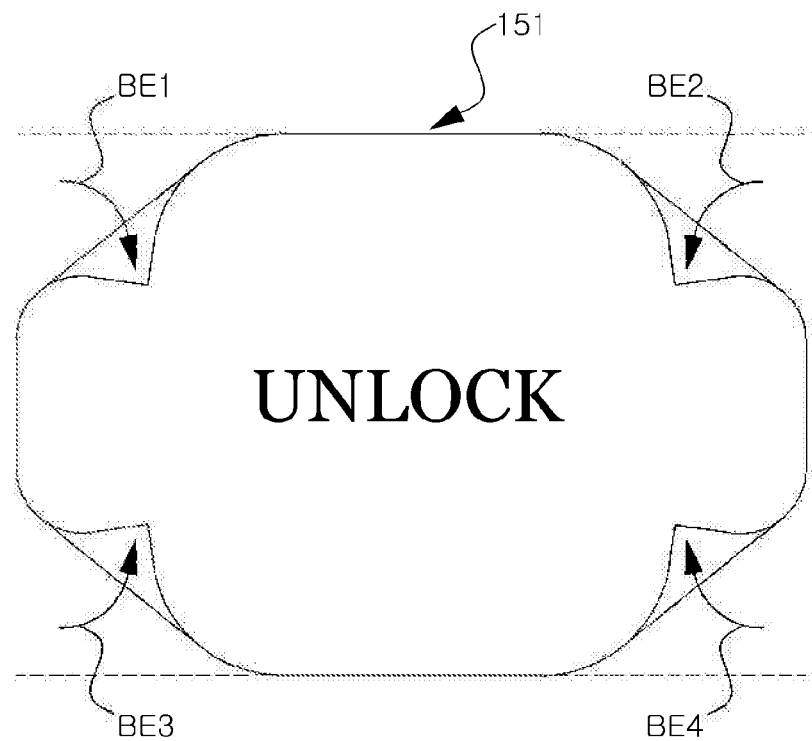

[Fig. 29]
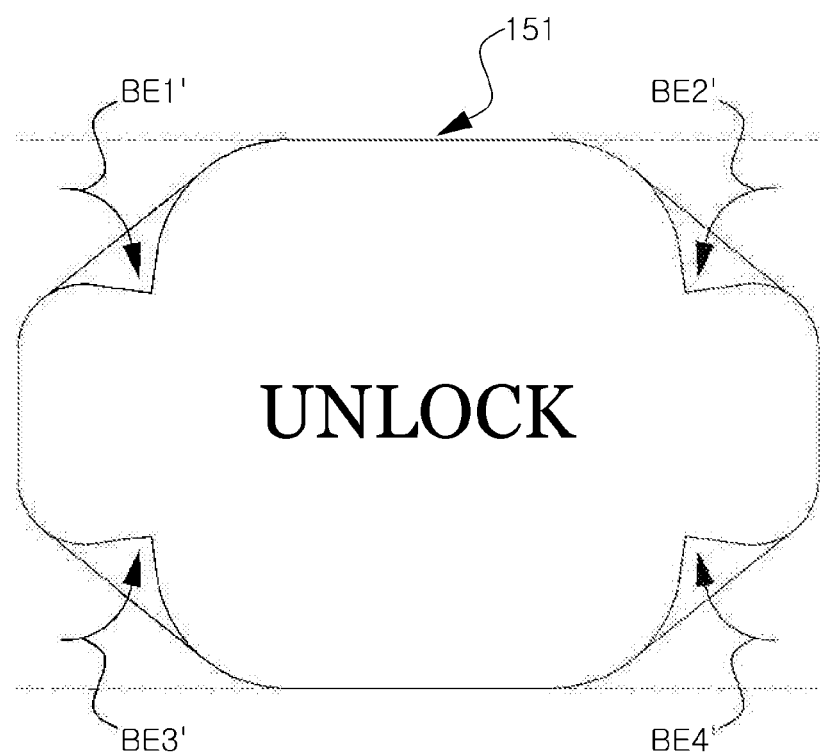

[Fig. 30]
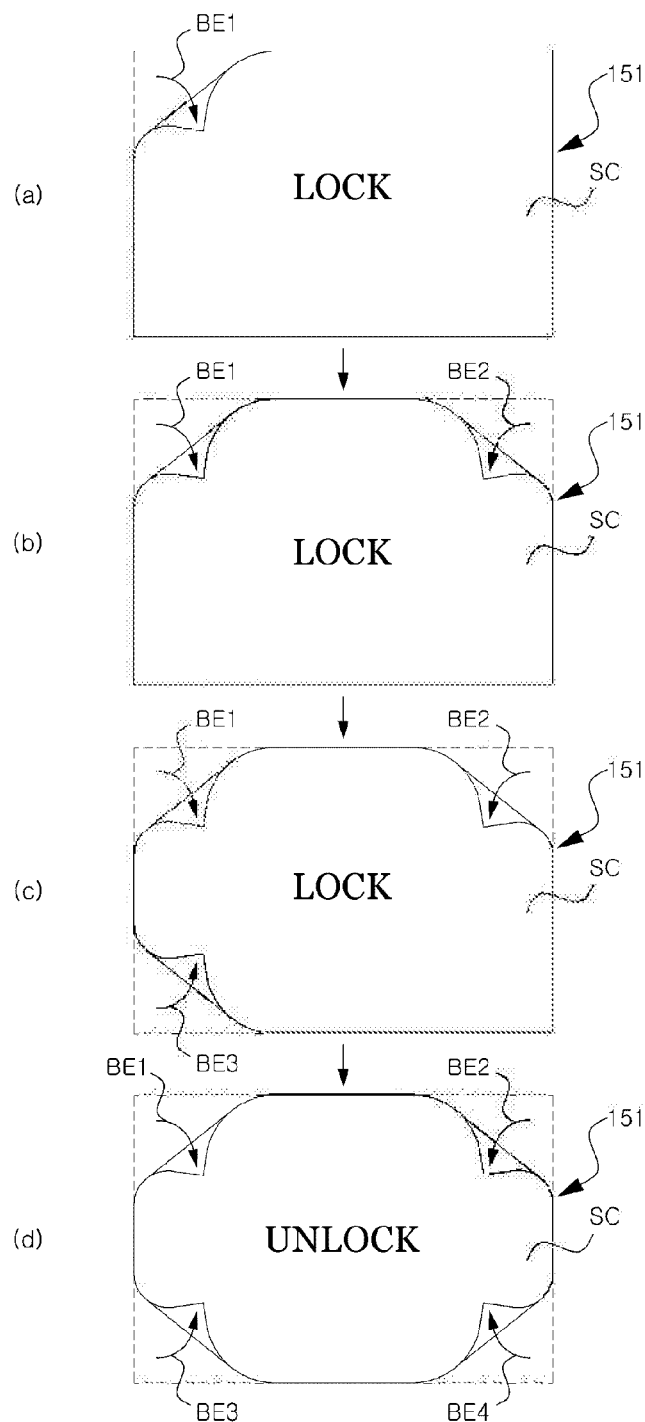

[Fig. 31]
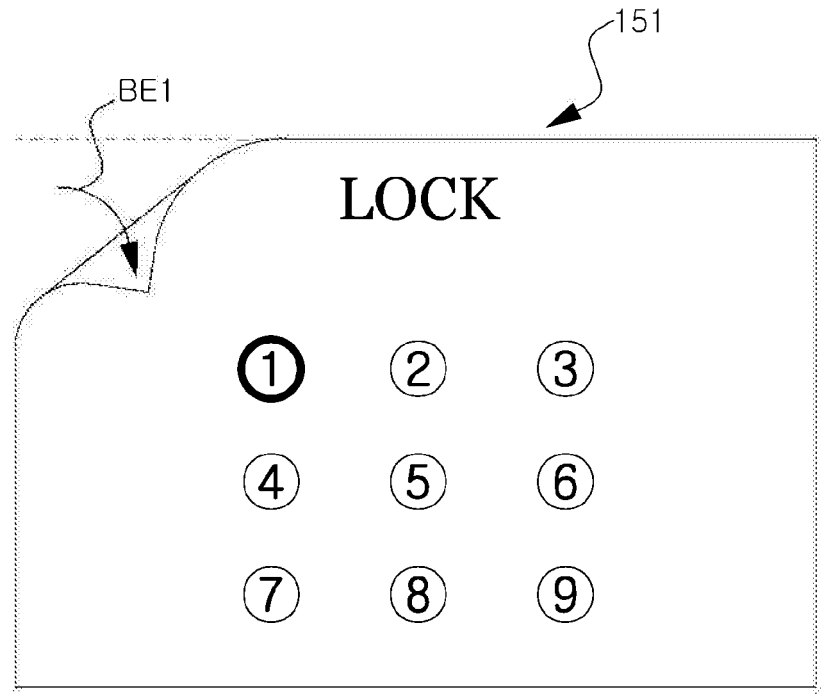
[Fig. 32]
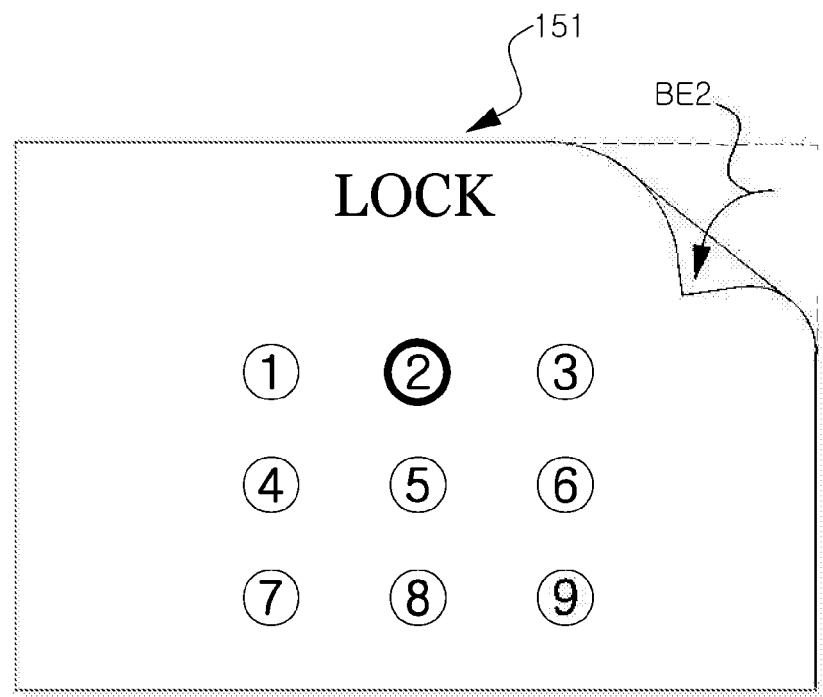

[Fig. 33]
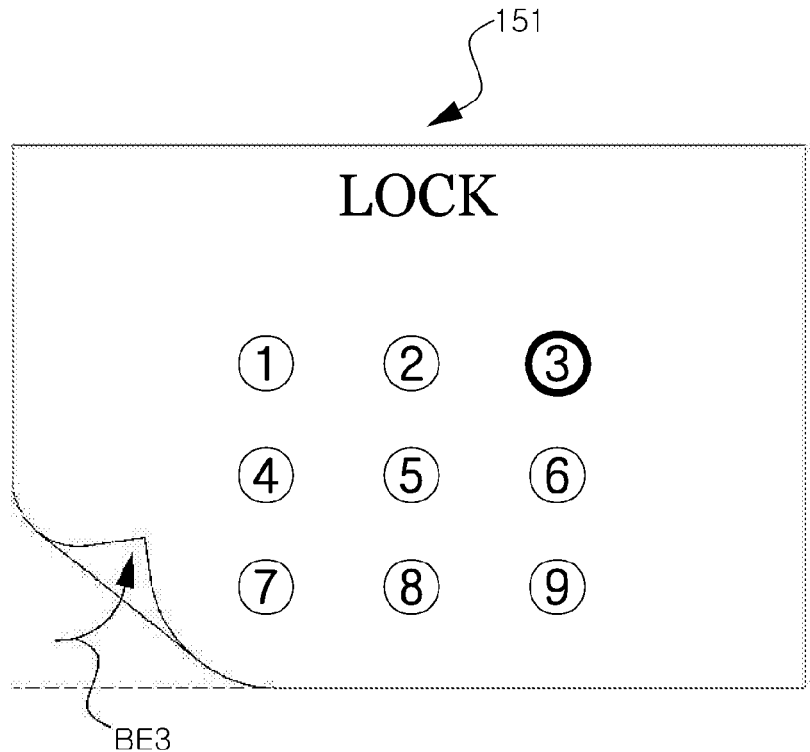
[Fig. 34]
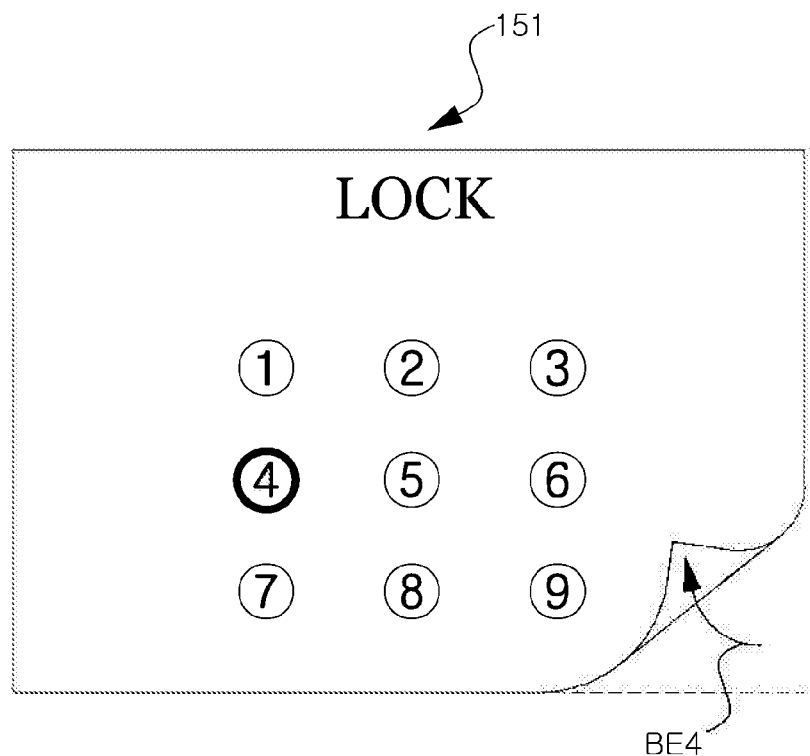

[Fig. 35]
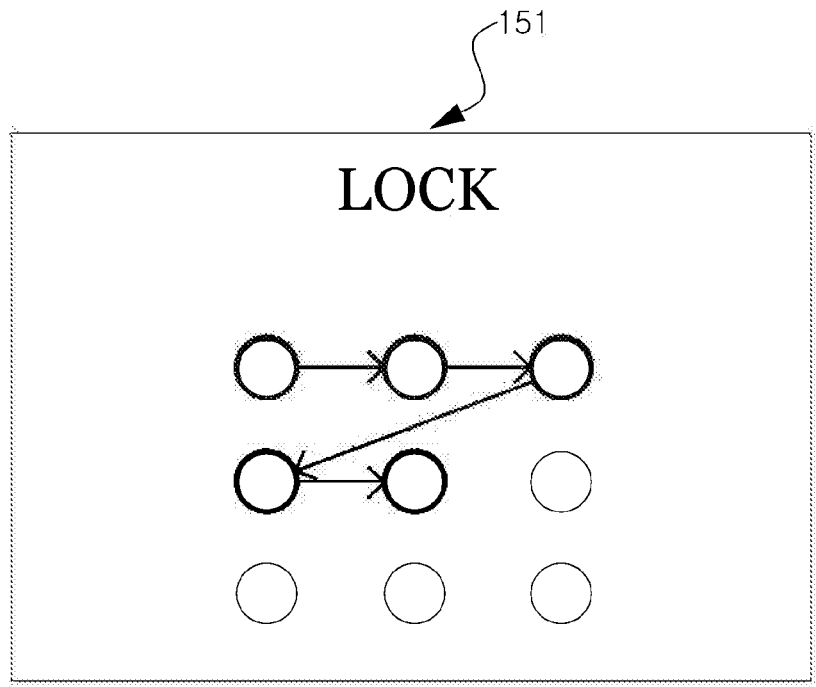
[Fig. 36]
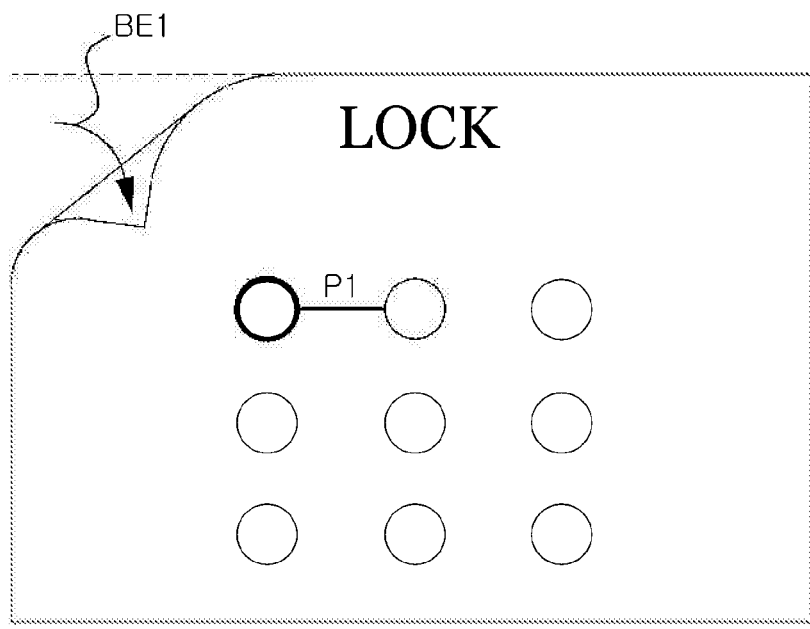

[Fig. 37]
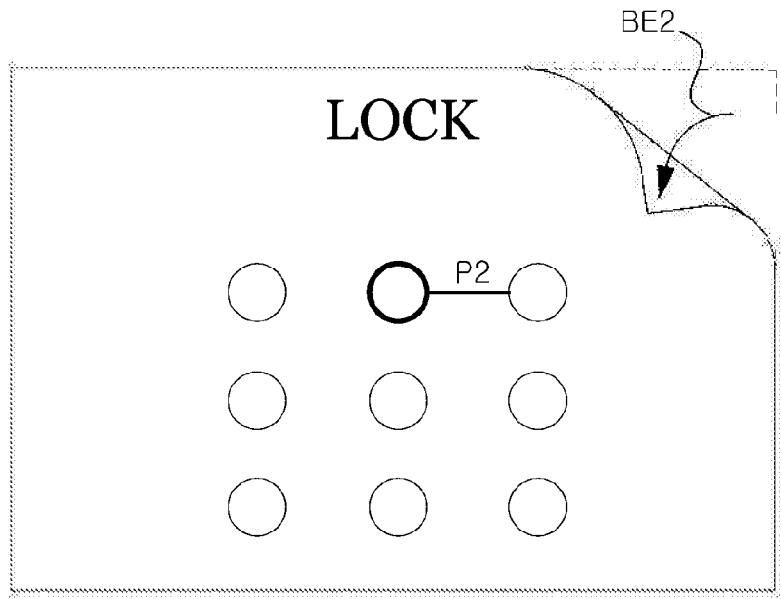
[Fig. 38]
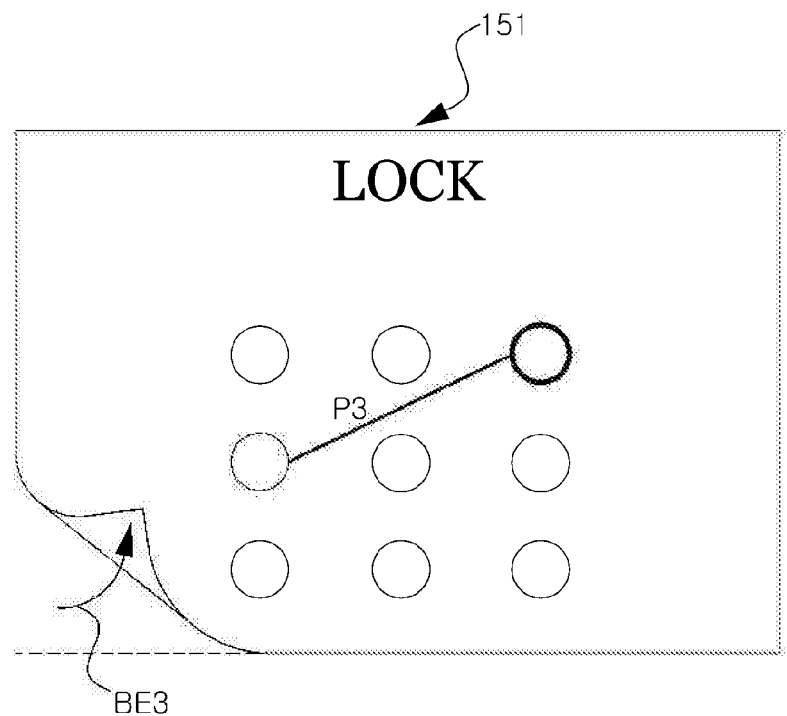

[Fig. 39]
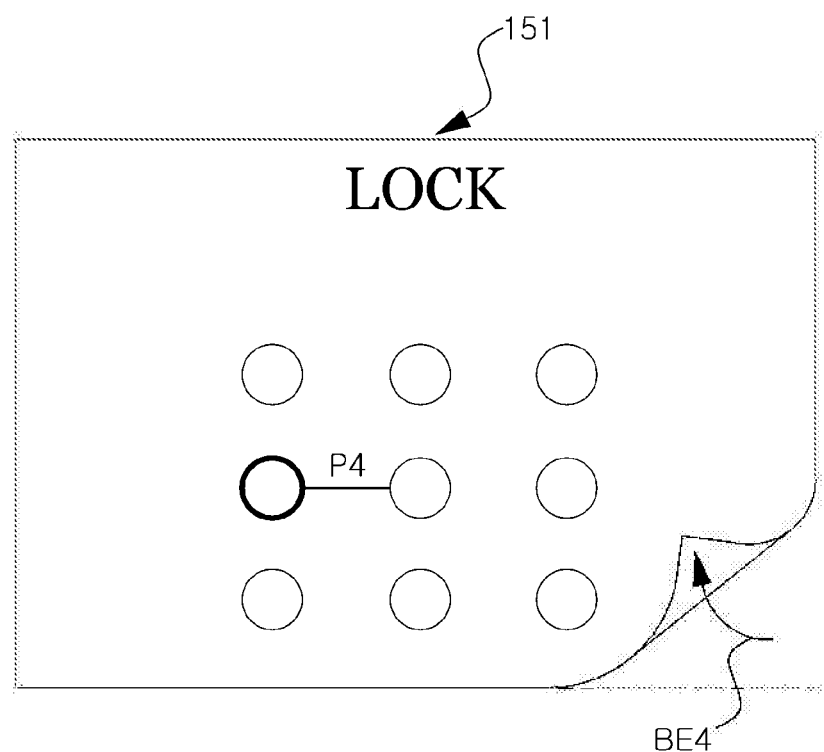

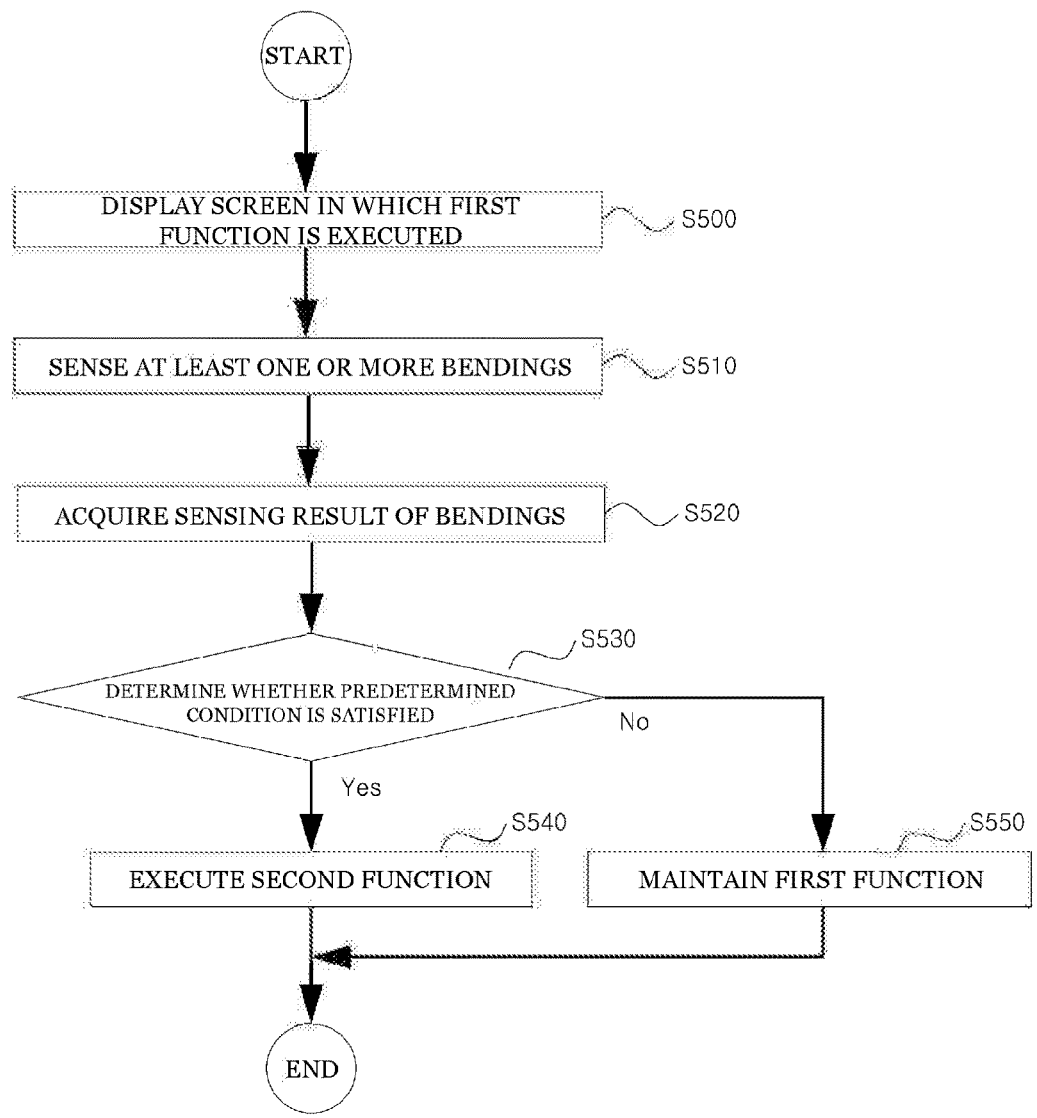
[Fig. 40]

[Fig. 41]
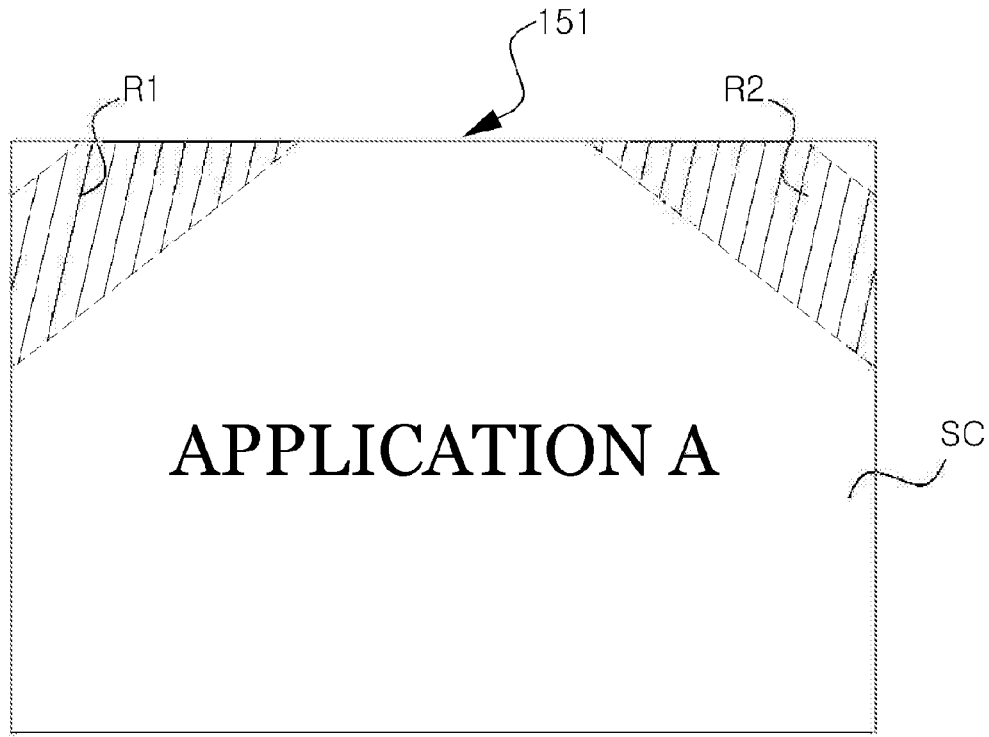
[Fig. 42]
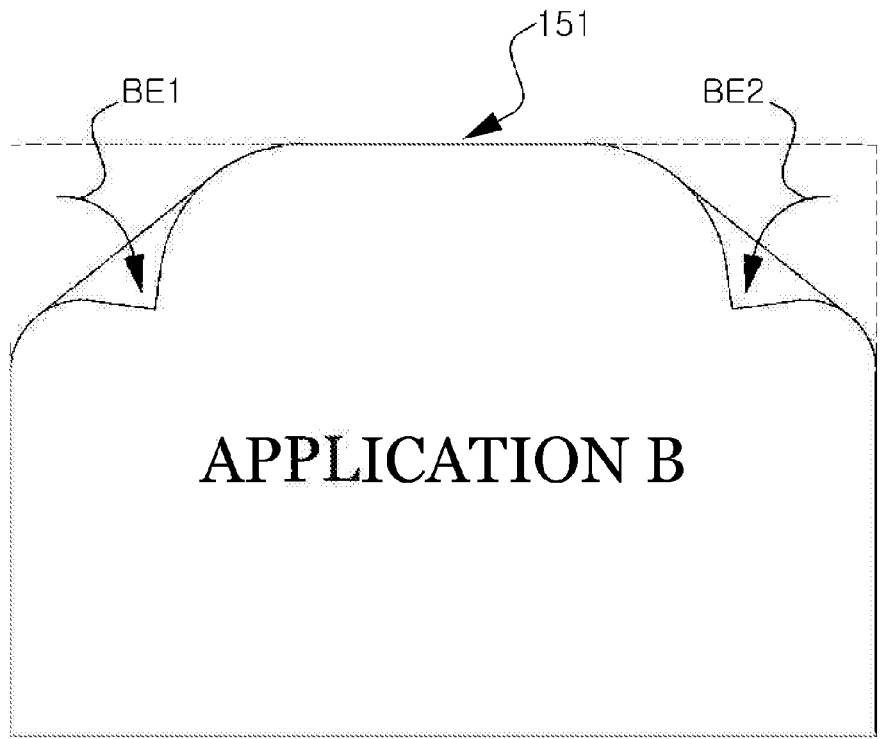

ELECTRONIC DEVICE AND A CONTROL METHOD THEREOF

BACKGROUND OF THE INVENTION

Field of the Invention

The present invention relates to an electronic device for providing a user interface that may be easily and familiarly used by a user who uses a flexible display, and a control method thereof.

Description of the Related Art

These days, there are many types of input devices such as a key pad, a mouse, a track ball, a touch pad, a joystick, a touch screen, or the like in order to manipulate a computer system. Such input devices are used to input data a user desires such as a letter, a symbol, a picture, or the like to a computer system and input a signal for requesting a specific command from the computer system.

Among the various input devices, recently, a touch input means such as a touch screen that can minimize and simplify a device by implementing an input means and an output function together is generally used.

A touch input means may sense contact with a touch region by a contact means such as a human body part of a user or a touch pen and may be classified into a resistive type, a capacitive type, and an optical type. The resistive-type touch input means senses a touch by recognizing a pressure applied to a contact point by the touch, the capacitive-type touch input means senses a touch through a change in an electric charge on a contact point caused by contact of a human body part of a user, and the optical-type touch input means detects a touch position using an infrared light camera and an infrared light lamp.

An initial method for providing a user interface using such a touch input means displays a manipulation means such as multiple buttons on a screen and performs a corresponding function based on a position where contact is sensed. Recently, in order to enhance a user's convenience and operability, a method of combining a variety of information such as a contact start position, a contact start time, a contact end position, and a contact end time, recognizing a user touch gesture such as tapping, dragging, sliding, and pinching, and executing various user commands according to the touch gesture is used. In addition, a method of recognizing multiple touch points in a touch region and executing a user command according to the number of, positions of, combinations of, and distance changes between the touch points.

Furthermore, recently, along with the development of organic light-emitting diode (OLED) technology, flexible display technology was developed. Much research has been conducted on various user interfaces using a flexible display.

However, a conventional user interface method using a touch has difficulty in user manipulation because a user makes a complex touch gesture or touches several points to draw a complex pattern. In addition, much research has been conducted on a user interface using the flexible display by changing the form of the flexible display while the flexible display is gripped with both hands. Thus, when a scheme in which several necessary commands are entered while the flexible display is gripped with both hands and an existing touch input scheme in which a touch gesture or a touch pattern is entered are combined with each other and used, the two-hand grip of the flexible display should be released in order to input a touch. Thus, it will be expected to have limitations.

In addition, the conventional user interface method has limitations in providing an instant response because it takes a certain time to perform and then recognize a touch gesture or touch pattern.

SUMMARY OF THE INVENTION

Technical Problem

The present invention is directed to providing an electronic device for providing a user interface that may overcome limitations of the conventional touch type user interface and may be easily and familiarly used by a user who uses a flexible display, and a control method thereof.

Technical Solution

An electronic device according to an embodiment of the present invention may include: a flexible display; a bending sensing unit configured to sense a first bending and a second bending of the flexible display; and a control unit configured to execute a first function based on a first sensing result of the first bending from the bending sensing unit and execute a second function based on a second sensing result of the second bending from the bending sensing unit, in which, when the first bending and the second bending correspond to a first predetermined condition, the control unit executes a third function based on the first bending and the second bending sensed by the bending sensing unit.

The control unit may execute the third function based on the first sensing result and the second sensing result.

The control unit may execute the third function based on the first predetermined condition, and the first predetermined condition may be a condition of a time difference between at least one of a start point and an end point of the first bending and at least one of a start point and an end point of the second bending.

The control unit may execute the third function based on the first predetermined condition, and the first predetermined condition may be a condition of a time difference between a return time of the first bending and a return time of the second bending.

The control unit may execute the third function based on the first predetermined condition, and the first predetermined condition may be a relation between at least one of a bending position, a bending region, a bending degree, a bending speed, a bending direction, and a bending duration of the first bending and at least one of a bending position, a bending region, a bending degree, a bending speed, a bending direction, and a bending duration of the second bending.

When the first bending and the second bending correspond to the first predetermined condition, the control unit may not execute the first function corresponding to the first sensing result of the first bending and the second function corresponding to the second sensing result of the second bending.

When the first bending and the second bending do not correspond to the first predetermined condition, the control unit may execute the first function based on the first sensing result of sensing a first bending state in which the first bending is started and corresponds to a second predetermined condition, and may execute the second function based on the first sensing result of sensing a second bending state in which the second bending is started and corresponds to the second predetermined condition.

The control unit may execute the first function and the second function based on the first sensing result and the second sensing result of sensing the first bending state and the second bending state corresponding to the second predetermined condition associated with at least one of a bending position, a bending region, a bending degree, a bending speed, a bending direction, and a bending duration.

When the second bending is started before the first bending is started and reaches a first bending state for executing the first function, the control unit may determine that the first predetermined condition is satisfied and execute the third function, and the first bending state may be determined based on at least one of a bending position, a bending region, a bending degree, a bending speed, a bending direction, and a bending duration.

When the second bending is started before the first bending is started and reaches a first bending state for executing the first function, the control unit may determine that the first predetermined condition is satisfied and may not execute the first function and the second function, and the first bending state may be determined based on at least one of a bending position, a bending region, a bending degree, a bending speed, a bending direction, and a bending duration.

An electronic device according to another embodiment of the present invention may include: a flexible display configured to display a screen in which a first function is executed; a bending sensing unit configured to sense at least one or more bendings of the flexible display; and a control unit configured to acquire a sensing result of the at least one or more bendings from the bending sensing unit, determine whether the acquired sensing result corresponds to a predetermined condition for changing a function, and when a result of the determination is that the acquired sensing result corresponds to the predetermined condition, release the first function based on the determination.

When the result of the determination is that the acquired sensing result does not correspond to the predetermined condition, the control unit may maintain the first function.

The control unit may determine whether the acquired sensing result corresponds to the predetermined condition including at least one of a bending position condition, a bending region condition, a bending degree condition, a bending speed condition, a bending direction condition, a bending duration condition, and a bending number condition.

The control unit may determine whether the acquired sensing result corresponds to the predetermined condition including at least one of a start point condition of the bending, an end point condition of the bending, and a return point condition of the bending.

The control unit may determine whether the acquired sensing result corresponds to the predetermined condition including a combination condition of reference bending states.

Each of the reference bending states may be a bending state that is preset to recognize any bending as a user's manipulation for executing any function.

The control unit may determine whether the acquired sensing result corresponds to the predetermined condition including any combination of reference bending states of at least one or more bendings.

The control unit may determine whether the acquired sensing result corresponds to the predetermined condition including a sequential combination of reference bending states of at least one or more bendings.

The control unit may determine whether the acquired sensing result corresponds to the predetermined condition including any combination condition of a numerical or alphanumeric keypad displayed on the flexible display.

The control unit may determine whether the acquired sensing result corresponds to the predetermined condition including any pattern condition of a keypad displayed on the flexible display.

Advantageous Effects

According to the electronic device and the control method thereof according to the present invention, it is possible to provide a user interface through which the user may easily control an operation corresponding to the user's manipulation.

According to the present invention, it is possible to simply control various operations corresponding to the user's manipulation according to an application executed in the flexible display.

According to the present invention, it is possible to simply control an operation corresponding to the user's manipulation such as conversion of an application executed in the flexible display.

According to the present invention, it is possible to execute a specific function by a bending combination of the flexible display to provide convenience to the user.

According to the present invention, it is possible to execute a specific function by a user's manipulation such as a bending even when the specific function can be executed by the user's manipulation such as a touch to allow a selective use suitable for convenience according to an operating environment.

BRIEF DESCRIPTION OF THE DRAWINGS

FIG. 1 is a block diagram of an electronic device according to some embodiments of the present invention.

FIG. 2 is a diagram for describing an exterior of an electronic device having a flexible display according to some embodiments of the present invention.

FIG. 3 is a diagram for describing another exterior of an electronic device having a flexible display according to some embodiments of the present invention.

FIG. 4 is a cross sectional view showing a section of the electronic device shown in FIG. 2A taken along line I-I'.

FIG. 5 is a cross sectional view showing a section of the electronic device shown in FIG. 3A taken along line J-J'.

FIGS. 6 to 8 are diagrams for describing a principle of sensing of bending of a flexible display according to some embodiments of the present invention.

FIGS. 9 and 10 are diagrams for describing a method of defining a bending region of a flexible display according to some embodiments of the present invention.

FIGS. 11 and 12 are diagrams for describing a method of defining a bending degree of a flexible display according to some embodiments of the present invention.

FIGS. 13 to 16 are diagrams for describing a method of determining a bending direction of a flexible display according to some embodiments of the present invention.

FIG. 17 is a flowchart for describing a first control method of an electronic device according to the present invention.

FIGS. 18 to 23 are diagrams for describing the first control method of an electronic device according to the present invention.

FIG. 24 is a flowchart for describing a second control method of an electronic device according to the present invention.

FIG. 25 is a flowchart for describing a third control method of an electronic device according to the present invention.

FIG. 26 is a flowchart for describing a fourth control method of an electronic device according to the present invention.

FIGS. 27 to 30 are diagrams for describing the fourth control method of an electronic device according to the present invention.

FIGS. 31 to 34 are other diagrams for describing the fourth control method of an electronic device according to the present invention.

FIGS. 35 to 39 are still other diagrams for describing the fourth control method of an electronic device according to the present invention.

FIG. 40 is a flowchart for describing a fifth control method of an electronic device according to the present invention.

FIGS. 41 and 42 are diagrams for describing the fifth control method of an electronic device according to the present invention.

DETAILED DESCRIPTION OF THE PREFERRED EMBODIMENT

Best Mode of the Invention

An electronic device according to an embodiment of the present invention may include: a flexible display; a bending sensing unit configured to sense a first bending and a second bending of the flexible display; and a control unit configured to execute a first function based on a first sensing result for the first bending from the bending sensing unit and execute a second function based on a second sensing result for the second bending from the bending sensing unit, in which, when the first bending and the second bending correspond to a first predetermined condition, the control unit executes a third function based on the first bending and the second bending sensed by the bending sensing unit.

Modes of the Invention

The above-described objects, characteristics, and advantages of the present invention will be more apparent by the following detailed description with reference to the accompanying drawings. Since the present invention may be variously modified and have several exemplary embodiments, specific exemplary embodiments will be shown in the accompanying drawings and be described in detail in a detailed description.

In the drawings, the thicknesses of layers and regions may be exaggerated for clarity. Also, when it is mentioned that an element or layer is 'on' another element or layer, the element or layer may be formed directly on another element or layer, or a third element or layer may be interposed therebetween. Like reference numerals refer to like elements throughout the specification.

Moreover, detailed descriptions about well-known functions or configurations associated with the present invention will be ruled out in order to not unnecessarily obscure the essence of the present invention. It should also be noted that, although ordinal numbers (such as first and second) are used in the following description, they are used only to distinguish similar components.

Hereinafter, an element according to the present invention will be described in detail with reference to the accompanying drawings. The suffixes "module" and "unit" for elements used in the following description are given or used interchangeably only for facilitation of preparing this specification, and thus they are not granted a specific meaning or function.

An electronic device described herein may include a mobile terminal, such as a cellular phone, a smartphone, a laptop computer, a digital broadcasting terminal, a personal digital assistant (PDA), a portable multimedia player (PMP), and a navigation device, as well as a stationary terminal, such as a digital TV and a desktop computer.

The control method of an electronic device according to the present invention may be applied to a device including a flexible display and a means capable of sensing a bending state of the flexible display.

The control method of an electronic device according to the present invention may be applied to any type of device as long as the device includes the means capable of sensing the bending state of the flexible display. That is, the device to which the control method of an electronic device according to the present invention may be applied may include a smartphone, a cellular phone, a tablet PC, a notebook, a desktop, a PDA, etc.

In the following description, an electronic device according to some embodiments of the present invention will be simply described, and then the control method of an electronic device according to some embodiments of the present invention will be described in detail.

Configuration of an Electronic Device

FIG. 1 is a block diagram of an electronic device according to some embodiments of the present invention.

An electronic device 100 may include a wireless communication unit 110, an audio/video (A/V) input unit 120, a user input unit 130, a sensing unit 140, an output unit 150, a memory 160, an interface unit 170, a control unit 180, a power supply unit 190 and the like. FIG. 1 shows the electronic device 100 having components, although all the illustrated components are not a requirement, and more or less components may alternatively be implemented.

The components will be described below in sequence.

The wireless communication unit 110 may include one or more modules that permit wireless communication between the electronic device 100 and a wireless communication system or a network within which the electronic device 100 is located. For example, the wireless communication unit 110 may include a broadcast receiving module 111, a mobile communication module 112, a wireless Internet module 113, a short-range communication module 114, a location information module 115 and/or the like.

The broadcast receiving module 111 receives a broadcast signal and/or broadcast associated information from an external broadcast managing server via a broadcast channel.

The broadcast channel may include a satellite channel and a terrestrial channel. The broadcast managing server may include a server that generates and transmits a broadcast signal and/or broadcast associated information, or a server that receives a pre-generated broadcast signal and/or broadcast associated information and transmits the pre-generated broadcast signal and/or the broadcast associated information to a terminal. The broadcast signal may include not only a TV broadcast signal, a radio broadcast signal, a data broadcast signal, but also a mixed signal of a data broadcast signal and a TV broadcast signal or a radio broadcast signal.

The broadcast associated information may include information on a broadcast channel, a broadcast program, or a broadcast service provider. The broadcast associated information may be provided over a communication network. In this case, the broadcast associated information may be received by the mobile communication module 112.

The broadcast associated information may include various forms. For example, the information may be provided in a form such as an electronic program guide (EPG) of Digital Multimedia Broadcasting (DMB) or an electronic service guide (ESG) of Digital Video Broadcasting-Handheld (DVB-H).

The broadcast receiving module 111 may receive a broadcast signal using various broadcast systems and may receive a digital broadcast signal using a digital broadcast system such as Digital Multimedia Broadcasting Terrestrial (DMBT), Digital Multimedia Broadcasting Satellite (DMBS), Media Forward Link Only (MediaFLO), Digital Video Broadcast Handheld (DVBH), Integrated Services Digital Broadcast Terrestrial (ISDBT), etc. It will be appreciated that the broadcast receiving module 111 may be configured to be suitable for another broadcast system in addition to the above-described digital broadcast systems.

The broadcast signal and/or the broadcast associated information received through the broadcast receiving module 111 may be stored in the memory 160.

The mobile communication module 112 transmits wireless signals to or receives wireless signals from at least one of a base station, an external terminal, and a server over a mobile communication network. The wireless signals may include voice call signals, video call signals, or various types of data according to transmission and reception of text and/or multimedia messages.

The wireless Internet module 113 is a module for supporting wireless Internet access. This module may be internally or externally coupled to the electronic device 100. Examples of the wireless Internet technology may include Wireless LAN (WLAN; Wi-Fi), Wireless Broadband (WI-BRO), World Interoperability for Microwave Access (Wimax), High Speed Downlink Packet Access (HSDPA), etc.

The short-range communication module 114 is a module for supporting short-range communications. Examples of the short-range communication technology include Bluetooth, Radio Frequency Identification (RFID), Infrared Data Association (IrDA), Ultra-WideBand (UWB), ZigBee, WiHD, WiGig, etc.

The location information module 115 is a module for identifying or otherwise obtaining a location of the electronic device 100. A Global Position System (GPS) module is a representative example of the location information module. According to the current technology, the GPS module 115 may calculate information on distances between one point or object and three or more satellites, and information on a time when distance information is measured, and apply trigonometry to the obtained distance information to obtain three-dimensional position information on the point or object according to latitude, longitude, and altitude at a predetermine time. Furthermore, a method of calculating position and time information using three satellites and correcting the calculated position and time information using another satellite may also be used. In addition, the GPS module 115 may continuously calculate a current position in real time and calculate velocity information using the location information.

Referring to FIG. 1, the A/V input unit 120 is configured to receive an audio or video signal, and may include a camera 121, a microphone 122, etc. The camera 121 processes an image frame of a still picture or video obtained by an image sensor in a video call mode or image capturing mode. The processed image frame may be displayed on a display 151.

The image frame processed by the camera 121 may be stored in the memory 160 or transmitted to the outside via the wireless communication unit 110. The camera 121 may be provided as two or more according to an aspect of the configuration of the terminal.

The microphone 122 may receive an external audio signal in a phone call mode, a recording mode, and a voice recognition mode and may process and convert the received audio signal into electric voice data. In the phone call mode, the processed voice data may be converted and output in a form that is transmittable to a mobile communication base station through the mobile communication module 112. Various noise removal algorithms for removing noise generated while the external audio signal is received may be implemented in the microphone 122.

The user input unit 130 generates input data used for a user to control an operation of a terminal. The user input unit 130 may include a keypad, a dome switch, a touch pad (e.g., static pressure/capacitance), a jog wheel, or a jog switch.

The sensing unit 140 senses a current status (or state) of the electronic device 100, such as an opened or closed state of the electronic device 100, a location of the electronic device 100, the presence or absence of a user contact with the electronic device 100, the orientation of the electronic device 100, and acceleration and/or deceleration of the electronic device 100, to generate a sensing signal for controlling the operation of the electronic device 100. For example, when the electronic device 100 is implemented as a slide type mobile phone, the sensing unit 140 may sense whether the slide phone is opened or closed. In addition, the sensing unit 140 may also be responsible for a sensing function associated with whether the power supply unit 190 supplies power or whether the interface unit 170 is coupled with an external device. The sensing unit 140 may include a posture sensor 141 and/or a proximity sensor 142.

The output unit 150 is intended to generate an output related to visual, auditory, and tactile senses and may include a display 151, an audio output module 152, an alarm 153, and a haptic module 154.

The display 151 outputs information processed by the electronic device 100. For example, when the electronic device is in a phone call mode, the display 151 displays a user interface (UI) or a graphic user interface (GUI), which is associated with the call. When the electronic device 100 is in a video call mode or an image capturing mode, the display 151 displays a captured image and/or a received image, a UI, or a GUI.

The display 151 may include at least one of a liquid crystal display (LCD), a thin film transistor-LCD (TFT-LCD), an organic light emitting diode (OLED) display, a flexible display, and a three-dimensional (3D) display.

Some of the above displays may be configured as a transparent or light-transmission type display through which the outside may be viewed. This may be called a transparent display. An example of the transparent display includes a transparent LCD. A rear portion of the display 151 may also have a light-transmission structure. Such a structure allows a user to view an object located at the rear portion of the terminal body through a portion which is occupied by the display 151 of the terminal body.

According to a type of implementing the electronic device 100, two or more display units 151 may be provided. For example, a plurality of display units may be spaced apart or integrally formed on one surface of the electronic device 100, and may also be arranged on different surfaces of the electronic device 100. Alternatively, the display 151 may be logically divided into two or more regions.

In a case where the display 151 and a touch sensor 143 are mutually layered (hereinafter, simply referred to as a "touch screen"), the display 151 may be used as an input device as well as an output device. The touch sensor 143 may have the form of, for example, a touch film, a touch sheet, or a touch pad.

The touch sensor 143 may be configured to convert a variation in capacitance that occurs at a specific region of the display 151 or a pressure exerted at a specific region of the display 151 into an electrical input signal.

When a touch input is applied to the touch sensor 143, a signal or signals corresponding to the touch input are sent to a touch controller. The touch controller processes the signal(s) to generate corresponding data, and transmits the data to the control unit 180. Accordingly, the control unit 180 may determine what region of the display 151 has been touched.

Referring to FIG. 1, the proximity sensor 142 may be provided to an internal region of an electronic device enclosed by the touch screen or around the touch screen. The proximity sensor 142 denotes a sensor that detects a presence or non-presence of an object approaching a predetermined detecting surface or an object existing around the proximity sensor 142 using the strength of an electromagnetic field of the object or an infrared ray without mechanical contact. The proximity sensor 142 has a longer life and a wider utility than a contact type sensor.

Examples of the proximity sensor 142 include a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like.

When the touch screen is a capacitive-type touch screen, the proximity of a pointer may be detected using a variation of an electric field according to the proximity of the pointer. In this case, the touch screen (i.e., touch sensor) may be classified as a proximity sensor.

The proximity sensor 142 may detect a proximity touch and a proximity touch pattern (e.g., a proximity touch distance, a proximity touch direction, a proximity touch speed, a proximity touch duration, a proximity touch position, a proximity touch movement state, etc.). Information corresponding to the detected proximity touch action and the detected proximity touch pattern may be output to the touch screen.

A geomagnetic sensor 144 is a sensor for sensing a rotation state and a movement direction of the electronic device 100, that is, the display 151. An acceleration sensor 145 is a sensor for sensing a degree of inclination of the display 151.

The geomagnetic sensor 144 and the acceleration sensor 145 may be used to detect bending characteristics such as a bending direction or a bending region of the flexible display. Separately, the geomagnetic sensor 144 and the acceleration sensor 145 may be used to detect a rotation state or an inclination state of the flexible display.

A bending sensor 146 may be a sensor for sensing a bending state of the flexible display. A detailed description thereof will be described along with the description of the method of sensing of bending.

A pressure sensor 147 senses a magnitude of pressure applied to the display and provides the sensed magnitude to the control unit 180 when a user performs a touch or bending operation. Here, the pressure sensor 147 may include a piezoelectric film which outputs an electric signal.

A grip sensor 148 is a sensor for sensing a grip of the user separately from the pressure sensor 148, and may be implemented as the pressure sensor 147 or the touch sensor 143.

The audio output module 152 may function to output audio data that is received from the wireless communication unit 110 or is stored in the memory 160 in a call-receiving mode, a call-placing mode, a recoding mode, a voice recognition mode, a broadcast reception mode and/or the like. The audio output module 152 outputs an audio signal relating to a particular function (e.g., a call received, a message received, etc.) performed by the electronic device 100. The audio output module 152 may include a receiver, a speaker, a buzzer, and so on.

The alarm 153 outputs a signal for announcing an occurrence of a particular event of the electronic device 100. Examples of the event may include call reception, message reception, key signal input, and touch input. The alarm 153 may output a signal for announcing the event occurrence by way of a video signal, an audio signal, or in another form, for example, as vibration. The video signal or the audio signal may be output via the display 151 or the audio output module 152.

The haptic module 154 generates various tactile effects that may be sensed by a user. Vibration may be representative of the tactile effects generated by the haptic module 154. An intensity and a pattern of the vibration generated by the haptic module 154 are controllable. For example, different vibrations may be output by being combined or may be output in sequence.

The haptic module 154 may generate various tactile effects as well as vibration. For example, the haptic module 154 may generate an effect of stimulation via the arrangement of pins vertically moving against a contact skin surface, an effect of stimulation via a suction power of air through an injection/suction hole, an effect of stimulation via rubbing a skin surface, an effect of stimulation via contact with an electrode, an effect of stimulation via an electrostatic force, an effect of stimulation via a warm or cold sense using an endothermic or exothermic device and/or the like.

The haptic module 154 may enable a user to sense a tactile effect through a muscle sense of a finger of the user, an arm or the like as well as to transfer the tactile effect through a direct contact. Two haptic modules 154 or more may be provided based on a corresponding configuration type of the mobile terminal 100.

The memory 160 may store programs for operating the control unit 180. The memory 160 may temporarily store input/output data (e.g., phonebook data, message data, a still image, and a video). The memory 160 may store data for various patterns of vibration and sound that are output in case of a touch input to the touch screen.

The memory 160 may include at least one of storage devices including a flash memory, a hard disk, a multimedia card micro type memory, a card-type memory (e.g., SD memory, XD memory, etc.), a random access memory (RAM), a static random access memory (SRAM), a read-only memory (ROM), an electrically erasable programmable read-only memory (EEPROM), a programmable read-only memory (PROM), a magnetic memory, and a magnetic or optical disk. The electronic device 100 may operate in association with a web storage for performing a storage function of the memory 160 on the Internet.

The interface unit 170 functions as a passage with all external devices connected to the electronic device 100. The interface unit 170 receives data from the external devices or is supplied with power, and then transfers the data or power to respective elements of the electronic device 100 or enables data within the electronic device 100 to be transferred to the external devices. For example, the interface unit 170 may include a wired/wireless headset port, an external charger port, a wired/wireless data port, a memory card port, a port for coupling to a device having an identity module, an audio input/output (I/O) port, a video I/O port, an earphone port, and/or the like.

The identity module is a chip for storing various kinds of information for authenticating a use authority of the electronic device 100 and may include a User Identify Module (UIM), a Subscriber Identity Module (SIM), a Universal Subscriber Identity Module (USIM) and/or the like. A device having an identity module (hereinafter referred to as an "identity device") may be manufactured as a smart card. The identity device may be connectible to the terminal 100 via a port.

When the electronic device 100 is connected to an external cradle, the interface unit 170 may become a passage for supplying the electronic device 100 with power from the cradle or a passage for delivering various command signals input from the cradle by the user to the electronic device 100. Each of the various command signals input from the cradle or the power may operate as a signal enabling the electronic device 100 to recognize that it is correctly loaded in the cradle.

The control unit 180 typically controls overall operations of the electronic device 100. For example, the control unit 180 performs control and processing associated with voice calls, data communications, video calls, etc. The control unit 180 may include a multimedia module 181 that provides multimedia playback. The multimedia module 181 may be implemented as part of the control unit 180, or may be implemented as a separate component.

The control unit 180 may perform a pattern recognizing process for recognizing a writing input or a picture drawing input carried out on the touch screen as characters or images, respectively.

The power supply unit 190 is supplied with internal power or external power by control of the control unit 180 and supplies a power required by an operation of each component.

Embodiments may be implemented in a computer-readable medium using, for example, computer software, hardware, and/or some combination thereof.

For hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and other electronic units designed to perform functions described herein. Embodiments may also be implemented by or in conjunction with the control unit 180.

For software implementation, embodiments may be implemented with separate software modules, such as procedures and functions, each of which may perform one or more of the functions and operations described herein. The software codes may be implemented with a software application written in any suitable programming language. The software codes may be stored in the memory 160 and executed by the control unit 180.

Flexible Display and Method of Sensing of Bending

A flexible display that may be applied to the electronic device 100 according to some embodiments of the present invention and the electronic device 100 to which the flexible display has been applied will be described below.

As described above, the electronic device 100 according to the present invention may include a display 151 that is implemented as the flexible display.

The flexible display is a display device that is formed of a flexible material configured to be bent or folded. In order words, the flexible display is a light and unbreakable display device that is manufactured on a bendable, foldable, or rollable substrate like a paper while maintaining display characteristics of an existing flat panel display. The flexible display may be called a bendable display and a flexible display.

Such a flexible display may be implemented using a TFT-LCD, an OLED, electrophoretic or laser induced thermal imaging (LITI) technology or the like.

In addition, electronic paper may be used as the flexible display. The electronic paper is a display device to which characteristics of ink and paper are applied and is also referred to as e-paper. Unlike a traditional flat panel display that provides backlight illumination to pixels, the electronic paper may use reflected light like general paper. Once an image or text is formed, the shape of the image or text may be maintained even without additional power supply.

The above-described flexible display is light and unbreakable. When the flexible display is applied to a mobile terminal, the flexible display has various shapes and arrangements, and thus may provide a mobile terminal with various forms and corresponding functions.

FIG. 2 is a diagram for describing an exterior of an electronic device having a flexible display according to some embodiments of the present invention.

An example in which the flexible display is provided in a mobile terminal will be simply and clearly described with reference to FIG. 2. Other elements that may be additionally included in the mobile terminal will be omitted in order to provide intuitive understanding.

FIG. 2 shows an example of an electronic device having the flexible display according to some embodiments of the present invention.

An electronic device 100 shown in FIG. 2 has two bodies B1 and B2. The two bodies B1 and B2 may be formed of a rigid material and thus may not be flexible.

A display 151 implemented with a flexible display may be provided at one side of the two bodies B1 and B2. Different flexible displays that are physically distinct may be arranged at each of the two bodies B1 and B2. However, preferably, one flexible display 151 may be arranged therein.

The two bodies B1 and B2 may be connected to each other by a hinge H. Furthermore, one of the two bodies B1 and B2 may be coupled with the other to rotate with respect to the hinge H. This means that the two bodies B1 and B2 may be coupled in a foldable manner.

FIG. 2A shows that the two bodies B1 and B2 are completely unfolded. As shown in FIG. 2A, a state in which the two bodies B1 and B2 are completely unfolded is simply referred to as a "flat state."

FIG. 2B shows that the two bodies B1 and B2 are slightly bent since the body B2 is slightly rotated. FIG. 2C shows that the two bodies B1 and B2 are completely folded. As shown in FIGS. 2B and 2C, a state in which the two bodies B1 and B2 are bent and coupled together is simply referred to as a "bending state." However, for convenience of description, as shown in FIG. 2C, a state in which the two bodies B1 and B2 are completely folded may be referred to as a "folded state."

As the two bodies B1 and B2 are changed from the flat state to the bending state, the flexible display 151 may also be bent.

The term "flat state" or "bending state" may be used according to a predetermined criterion or depending on whether the display 151 is completely unfolded or is bent. For example, as shown in FIG. 2A, it is possible to express "the display 151 is flat" or "the display 151 is in a flat state." As shown in FIGS. 2B and 2C, it is possible to express "the display 151 is bent" or "the display 151 is in a bending state."

FIG. 2 shows a case in which there are two bodies that are rotatably coupled. However, the electronic device 100 need not necessarily be composed of two bodies, and may be composed of three or more bodies. In this case, one body may be rotatably coupled with other adjacent bodies.

FIG. 3 is a diagram for describing another exterior of an electronic device having a flexible display according to some embodiments of the present invention.

The exterior of the electronic device described with reference to FIG. 2 includes the first body B1 and the second body B2 formed of a rigid material and connected by the hinge H. However, unlike that shown in FIG. 2, the exterior of the electronic device shown in FIG. 3 may include the third body B3 formed of a flexible material like the flexible display.

In this case, the degree of freedom of a flexing operation of the flexible display may increase significantly compared to that of the flexible display shown in FIG. 2 in which a folding position of the flexible display cannot be varied through the rotation of the first body B1 and the second body B2 which are rigid.

For example, as shown in FIG. 3B, the flexible display may be bent and transformed with respect to the y-axis of a Cartesian coordinate that may be set on a display surface of the electronic device 100. In addition, as shown in FIG. 3C, the flexible display may be bent and transformed with respect to the x-axis of the Cartesian coordinate that may be set on the display surface of the electronic device 100.

As another example, when flexing is performed as shown in FIG. 3B or when flexing is performed as shown in FIG. 3C, a bending position may not be fixed.

As still another example, the display of the electronic device 100 may be bent such that only an upper right corner of the electronic device 100 shown in FIG. 3A is partially flexed.

A detailed description thereof will be provided along with the description of the method of sensing of bending.

FIG. 4 is a cross sectional view showing a section of the electronic device shown in FIG. 2A taken along line I-I'. The thicknesses of layers of the bodies B1 and B2 and the display 151 are exaggeratedly shown in FIG. 4. The layers may be thicker or thinner than those shown in FIG. 4. A relative thickness of each layer may be different from that shown in FIG. 4. That is, it is shown that the display 151 has a smaller thickness than the bodies B1 and B2. However, the bodies B1 and B2 may be thinner than the display 151. As shown in FIG. 4A, the electronic device 100 according to some embodiments of the present invention may be configured such that a sum of the areas of the bodies B1 and B2 is the same as the area of the display 151 when seen from a direction V shown in FIG. 4. Alternatively, as shown in FIGS. 4B and 4C, the electronic device 100 may be configured such that the sum of the areas of the bodies B1 and B2 is greater than the area of the display 151.

As shown in FIG. 4B, the electronic device 100 according to some embodiments of the present invention may have the bodies B1 and B2 having edges that protrude in a direction in which the display 151 is disposed. Furthermore, as shown in FIG. 4C, the edges may further extend horizontally to partially overlap the display 151.

Although not shown, other elements may be interposed between each of the bodies B1 and B2 and the display 151. Furthermore, another element may be further disposed on the display 151. In addition, another element may also be further disposed below the bodies B1 and B2. However, such elements are not directly associated with the description of the present invention, and thus a detailed description thereof will be omitted.

FIG. 5 is a cross sectional view showing a section of the electronic device shown in FIG. 3A taken along line J-J'. The thicknesses of layers of a body B3 and the display 151 are exaggeratedly shown in FIG. 5. The layers may be thicker or thinner than those shown in FIG. 5. A relative thickness of each layer may be different from that shown in FIG. 5. That is, it is shown that the display 151 has a smaller thickness than the body B3. However, the body B3 may be thinner than the display 151.

As shown in FIG. 5A, the electronic device 100 according to some embodiments of the present invention may be configured such that a sum of the areas of the bodies B1 and B2 is the same as that of the display 151 when seen from a direction V shown in FIG. 5. Alternatively, as shown in FIGS. 5B and 5C, the electronic device 100 may be configured such that the area of the third body B3 is greater than the area of the display 151.

As shown in FIG. 5B, in the electronic device 100 according to some embodiments of the present invention, an edge of the third body B3 may protrude to be wider than the display 151. Furthermore, as shown in FIG. 5C, the edge may extend horizontally to partially overlap the display 151.

Although not shown, other elements may be interposed between the body B3 and the display 151. Furthermore, another element may be further disposed on the display 151. In addition, another element may be further disposed below the body B3. However, such elements are not directly associated with the description of the present invention, and thus a detailed description thereof will be omitted.

Each region of the electronic device 100 that is shown in FIGS. 4 and 5 by dashed lines is a grip portion GP that is mainly grasped by a user. The grip portion GP denotes each of the regions illustrated in FIGS. 4 and 5 by dashed lines. However, the position of the grip portion GP is not limited thereto. For example, when the electronic device 100 is flexed as shown in FIG. 3C, it should be noted that the grip portion GP may be an upper side or a lower side of the electronic device 100.

In addition, according to the electronic device 100 shown in FIGS. 2 to 5, it is shown that the first to third bodies B1, B2, and B3 are arranged to overlap the entire region of the display 151. However, the first to third bodies B1, B2, and B3 may be arranged to partially overlay the display 151. For example, a rigid body may be provided only to the position of the grip portion GP shown in FIGS. 4 and 5. The rigid body may not be provided to a center region of the display 151.

As described above, the electronic device 100 may sense a state of the display 151. To this end, the electronic device 100 may include a bending sensor 146 for sensing whether the display 151 is folded (in a bending state) or unfolded (in a flat state) (hereinafter, "whether the display 151 is bent"). Furthermore, the bending sensor 146 may sense a position at which the display 151 is folded (hereinafter referred to as a "bending position"), and may sense a degree to which the display 151 is folded (hereinafter referred to as a "bending degree").

In this case, the above-described bending sensor 146 for sensing whether the flexible display 151 is bent may be included in the flexible display. The sensor may be arranged in a plurality. When two or more sensors are provided, the sensors may be arranged to be spaced apart from each other on at least one edge of the flexible display.

The above-described bending sensor 146 for sensing whether the flexible display 151 is bent may be provided in the first to third bodies B1 to B3.

Here, the sensor for sensing whether the flexible display is bent is referred to as a "bending sensor" for convenience of description. The present invention is not limited to the implementation method and form of such a bending sensor 146. However, it is preferable that the control unit 180 may use electric signals to sense the degree and/or position of the bending of the flexible display.

A method of sensing whether the flexible display is bent will be described below.

The bending may include normal bending, folding, or rolling. Normal bending may denote a state in which the flexible display 151 is bent. Folding may denote a state in which the flexible display 151 is folded. Here, the folding and the normal bending may have relative concepts that are determined according to the bending degree.

Rolling denotes a state in which the flexible display device is rolled. The rolling may also be determined on the basis of a bending angle. As an example, a state in which bending having a bending angle greater than a predetermined value is sensed may be defined as the rolling.

The normal bending, the folding, and the rolling may be determined on the basis of a radius of curvature other than the bending angle. The rolling may be defined as a state in which a section of the flexible display device 100 that is rolled has a substantially circular or ovular shape.

However, the definition of the above-described variations is merely an example. It should be noted that the variations may be defined differently depending on the type, size, weight, or characteristics of the flexible display 151.

The above-described various forms of bending and other bending forms are collectively defined as "bending."

The flexible display 151 may sense the bending in various ways. As an example, the bending may be sensed by the above-described bending sensor 146.

Here, the bending sensor 146 may include a bend sensor disposed on a surface of at least one surface of the display 151, and the control unit 180 may use a result sensed by the bend sensor to sense the bending.

Here, the bend sensor is a sensor having characteristics in which a resistance value varies depending on the bending degree and may be implemented in various forms such as an optical fiber bending sensor, a pressure sensor, and a strain gauge.

The sensing of bending may be implemented by using the magnitude of voltage applied to the bend sensor or the magnitude of current flowing through the bend sensor to sense a resistance value of the bend sensor.

The bending will be described in detail by, for example, using a bend sensor that is in the form of a plurality of bars arranged in the form of a lattice as a means for sensing the bending of the flexible display 151.

FIGS. 6 to 8 are diagrams for describing a principle of sensing of bending of a flexible display according to some embodiments of the present invention.

Referring to FIGS. 6 to 8, the bend sensor may include first direction bend sensors 1-1 to 1-7 arranged to be spaced apart in a first direction and second direction bend sensors 2-1 to 2-7 arranged to be spaced apart in a second direction.

Here, FIGS. 6 to 8 show that seven bend sensors 146 are disposed in each of the first direction and the second direction. However, this is merely an example and may be variously changed depending on the size of the flexible display 151.

The bend sensor 146 may be implemented in the form of an electrical resistance sensor that uses an electrical resistance or a micro-optical fiber sensor that uses a strain rate of an optical fiber. The following description assumes that the bend sensor 146 is implemented as the electrical resistance sensor.

In detail, as shown in FIG. 7, when a center region positioned at a center between left and right edges of the flexible display 151 is bent perpendicularly downward from the surface of the flexible display 151, a tensile force caused by the bending is applied to the bend sensors 1-1 to 1-7 arranged in the first direction. A resistance value of each of the bend sensors 1-1 to 1-7 arranged in the first direction is changed according to the tensile force.

The control unit 180 may sense the change in an output value that is output from each bend sensor 1-1 to 1-7 to sense that the bending is made in the first direction with respect to the center of the surface of the display.

Here, FIG. 7 shows a state in which the center region is bent perpendicularly downward from the surface of the flexible display 151. However, even when the center region is bent perpendicularly upward from the surface of the flexible display 151, the bending may be sensed based on the change in the output value of the bend sensors 1-1 to 1-7 arranged in the first direction.

In addition, as shown in FIG. 8, when the center region positioned at the center on the basis of upward and downward edges of the flexible display 151 is bent perpendicularly downward from the surface of the flexible display 151, a tensile force is applied to the bend sensors 2-1 to 2-7 arranged in the second direction.

In this case, the control unit 180 may sense that the bending is made in the second direction based on output values of the bend sensors 2-1 to 2-7 arranged in the second direction. Even when the center region is bent perpendicularly upward from the surface of the flexible display 151, the bending may be sensed based on the change in the output values of the bend sensors 2-1 to 2-7 arranged in the second direction.

For a bending in a diagonal direction, since the tensile force is applied to all bend sensors disposed in the first direction and the second direction, the diagonal bending may also be sensed based on the output values of the first direction bend sensors 1-1 to 1-7 and the second direction bend sensors 2-1 to 2-7.

FIGS. 9 and 10 are diagrams for describing a method of defining a bending region of a flexible display according to some embodiments of the present invention.

FIGS. 9 and 10 are diagrams for describing a case in which a center region positioned at the center between left and right edges of the flexible display 151 is bent perpendicularly downward from the surface of the flexible display 151 (three bend sensors 3-1 to 3-3 are disposed in the first direction). Accordingly, for convenience of description, it should be noted that the bend sensors arranged in the second direction have not been shown.

The bending region denotes a region in which the flexible display 151 is bent. The bending region may be defined as all points in which the bend sensors that output resistance values different from original resistance values are disposed and may act as an element for determining the position of the bending.

In detail, when a distance between the points from which the change in the resistance values has been sensed is less than a predetermined distance, the control unit 180 senses the points that output the resistance values as one bending region. On the other hand, when there is a point spaced a predetermined distance or more from the other points from which the change in the resistance values is sensed, the control unit 180 may define another separate bending region on the basis of the point.

Referring to FIG. 9, when the flexible display 151 is bent, points a1 to a5 of a bend sensor 3-1, points b1 to b5 of a bend sensor 3-2, and points c1 to c5 of a bend sensor 3-3 have resistance values different from the original resistance values.

In this case, the points of each of the bend sensors 3-1 to 3-3 from which the change in the resistance values is sensed are positioned within a predetermined distance and successively disposed.

Accordingly, the control unit 180 senses a region 32 including the points a1 to a5 of the bend sensor 3-1, the points b1 to b5 of the bend sensor 3-2, and the points c1 to c5 of the bend sensor 3-3 as one bending region.

FIG. 10 shows a diagram for describing a method of sensing a plurality of bending regions. Referring to FIG. 10, the points a1 to a3 and the points a5 to a7 of the bend sensor 3-1, the points b1 to b3 and the points b5 to b7 of the bend sensor 3-2, and the points c1 to c3 and the points c5 to c7 of the bend sensor 3-3 have resistance values different from the original resistance values.

In the bend sensor 3-1, the points a1 to a3 are successive, and also the points a5 to a7 are successive. However, the points a3 to a5 are not successive because there is the point a4 between the point a3 and the point a5.

Accordingly, in consideration that a distance between the point a3 and the point a5 is spaced apart a predetermined distance, the points a1 to a3 and the points a5 to a7 may be classified as different bending regions. In addition, each point of the other bend sensors 3-2 and 3-3 may be classified in the same manner.

Accordingly, the control unit 180 may sense a region R1 including the points a1 to a3 of the bend sensor 3-1, the points b1 to b3 of the bend sensor 3-2, and the points c1 to c3 of the bend sensor 3-3 as one bending region, and may define a region R2 including the points a5 to a7 of the bend sensor 3-1, the points b5 to b7 of the bend sensor 3-2, and the points c5 to c7 of the bend sensors 3-3 as another bending region.

The bending region may include a bending line. The bending line may be defined as a line that connects points from which the greatest resistance values are detected in respective bending regions.

The bending line may serve as an element for determining the position of the bending.

For example, in FIG. 9, a line L1 connecting the points a3, b3, and c3 may be defined as the bending line. In FIG. 10, a line L2 connecting the points a2, b2, and c2 and a line L3 connecting the points a6, b6, and c6 may be defined as the bending line.

FIGS. 11 and 12 are diagrams for describing a method of determining a bending degree of a flexible display according to some embodiments of the present invention.

The bending degree may be determined using the change in magnitude of the resistance value that is output by the bend sensor at certain intervals. In detail, the control unit 180 calculates a difference between a greatest resistance value that is output by the bend sensor and a resistance value that is output at a point spaced a predetermine distance from a point at which the greatest resistance value is output.

The control unit 180 may use the calculated resistance difference to determine the bending degree. In detail, the electronic device 100 may classify the bending degree into a plurality of levels, and may match a resistance value having a certain range to each level and store the matched resistance values.

Thus, the control unit 180 may determine the bending degree according to a level in which the calculated resistance difference is included among the plurality of levels classified according to the bending degree.

For example, as shown in FIGS. 11 and 12, the control unit 180 may determine the bending degree on the basis of a difference between a resistance value output at the point a5 at which the greatest resistance value is output by the bend sensor 146 and a resistance value output at the point a4 spaced a predetermined distance from the point a5.

In detail, in the embodiment shown in FIGS. 11 and 12, the control unit 180 may check a level in which the calculated resistance difference is included among the plurality of levels that are stored, and may determine the bending degree corresponding to the checked level. Here, the bending degree may be represented as a bending angle or a bending strength.

Since the bending degree in the embodiment shown in FIG. 12 is greater than that in the embodiment shown in FIG. 11, a difference between the resistance value output at the point a5 and the resistance value output at the point a4 in the embodiment shown in FIG. 12 becomes greater than a difference between the resistance value output at the point a5 and the resistance value output at the point a4 in the embodiment shown in FIG. 11. Thus, the control unit 130 may determine that the bending degree is greater when the bending is made in FIG. 12.

FIGS. 13 and 16 are diagrams for describing a method of determining a bending direction of a flexible display according to some embodiments of the present invention.

Referring to FIGS. 13 to 15, the bending direction may be determined by overlapping bend sensors 146a and 146b. Referring to FIG. 16, the bending direction may be determined by positioning the bend sensors 146a and 146b on both surfaces of the flexible display 151.

In detail, referring to FIG. 13, the two bend sensors 146a and 146b may be provided at one side of the flexible display 151 to overlap each other.

In this case, when the bending is made in one direction, resistance values detected by an upper bend sensor 146a and a lower bend sensor 146b are different from each other at a point where the bending is made. Accordingly, the bending direction may be determined by comparing the resistance values of the two bend sensors 146a and 146b at the same point.

For example, when the flexible display 151 is bent as shown in FIG. 14, a tensile force of a greater strength is applied to the lower bend sensor 146b than to the upper bend sensor 146a at point A corresponding to a bending line.

On the other hand, when the flexible display 151 is bent toward a rear surface as shown in FIG. 15, a tensile force of a greater strength is applied to the upper bend sensor 146a than to the lower bend sensor 146b.

Accordingly, the control unit 180 may determine the bending direction by comparing the resistance values corresponding to the point A of the two bend sensors 146a and 146b.

Referring to FIG. 16, while a compressive force is applied to the bend sensor 146a disposed on a first surface (an upper surface) out of both of the surfaces of the flexible display 151 according to the bending direction of the flexible display 151, a tensile force is applied to the bend sensor 146*b* disposed on a second surface (a lower surface). As described above, values sensed by the two bend sensors may be different from each other depending on the bending direction. The control unit 180 may identify the bending direction according to the detection characteristics of the values.

FIGS. 13 to 16 show that the two bend sensors are used to sense the bending direction. However, the bending direction may be identified using only a strain gauge disposed on one surface of the display unit 110. That is, since the compressive force or the tensile force is applied depending on the bending direction, the strain gauge disposed on one surface may be aware of the bending direction by checking the characteristics of the output value.

Alternatively, the bending direction may be sensed using various sensors such as a gyro sensor, a geomagnetic sensor, and an acceleration sensor.

The control unit 180 may determine a bending speed through a resistance variation sensed by the bend sensor. In detail, the electronic device 100 may classify the bending degree into a plurality of levels, and may match a resistance variation having a certain range to each level and store the matched resistance values.

Thus, the control unit 180 may determine the bending speed according to a level in which the calculated resistance variation is included among the plurality of levels classified according to the bending speed.

Control Method of an Electronic Device

1. Method of Providing First User Interface

A control method of an electronic device according to the present invention will be described below using the electronic device 100 that has been described with reference to FIGS. 1 to 16.

FIG. 17 is a flowchart for describing a first control method of an electronic device according to the present invention, and FIGS. 18 to 23 are diagrams for describing the first control method of an electronic device according to the present invention.

Referring to FIG. 17, the first control method of an electronic device according to the present invention may include sensing a first bending BE1 (S100), determining whether a second bending satisfying a first predetermined condition is sensed (S110), and executing a third function (S120) or executing a first function and/or a second function (S130) according to a result of the determination.

The steps will be described below in detail with reference to FIGS. 18 to 21.

First, the electronic device 100 according to the present invention may sense a bending through the bending sensing unit 146 and may perform an operation corresponding to the bending that is a user's manipulation on the basis of a result of the sensing. Here, the operation corresponding to the user's manipulation may vary depending on what electronic device is used to implement the flexible display 151.

For example, when the flexible display 151 is applied to a cellular phone, the electronic device 100 may perform an operation corresponding to a user's manipulation among various operations such as call connection, reception refusal, menu display, text transmission and reception, application selection and execution, and web browser execution and completion. As another example, when the flexible display 151 is applied to a TV, the electronic device 100 may perform an operation corresponding to a user's manipulation among various operations such as channel selection, volume adjustment, brightness adjustment, color adjustment, and contrast adjustment. In addition, the flexible display 151 may be implemented as various types of display devices such as a PDA, an electronic photo frame, an electronic book, an electronic notebook, an MP3 player, a tablet PC, a laptop computer, or a monitor, and may perform various operations suitable for the devices. Further, the flexible display 151 may perform general operations such as a locking operation, an unlocking operation, a turn-on operation, or a turn-off operation regardless of the type of the electronic device to which the flexible display 151 is applied.

In addition, the operation corresponding to the user's manipulation may be implemented variously depending on an application performed by the electronic device to which the flexible display 151 is applied. That is, a function corresponding to the user's function among functions supported by the application may be performed. As an example, when an electronic book application is executed, the flexible display device 100 may perform an operation according to a function corresponding to the user's manipulation among various functions such as content conversion, page changing, enlargement, reduction, and bookmarking.

As shown in FIG. 18, the control unit 180 may display a specific screen on the flexible display 151 (hereinafter, referred to as a display) that is in a first state.

Here, the specific screen may be a screen for a specific application (including a web browser) that is selected according to a user's input and/or a specific event that occurred in the electronic device 100. For example, FIG. 18 shows that the electronic device 100 displays, on the display 151, a screen in which a Google web browser, which is one of web browsers, is executed.

Here, the first state may be a state that is different compared to a state in which the display 151 is bent and thus a function is executed by the control unit 180. For example, the first state of the display 151 may be a flat state.

However, it should be noted that the first state need not necessarily be the flat state and may be another bending state different from a bending for function execution.

Next, the bending sensing unit 146 may sense the first bending BE1 of the display 151 (S100).

The bending sensing unit 146 may include a bending sensor 146 including the bend sensor described with reference to FIGS. 7 to 16, but is not limited thereto. Thus, the bending sensing unit 146 may use various sensors.

However, in the following description, the bending sensing unit 146 and the bending sensor 146 will use the same reference number.

The first bending BE1 may be a user's manipulation for executing a first function while the Google web browser is executed. As shown in FIG. 19, the first function may be a downward scroll S1 function for moving a screen downward while the Google web browser is executed.

In addition, as shown in FIG. 19, the first bending BE1 may denote that the display 151 is bent while an upper left corner of the display 151 is gripped with fingers or like, but is not limited thereto. Thus, the first bending BE1 may include folding or rolling.

In order for the first bending BE1 to be the user's manipulation for executing the first function, that is, a downward scroll function of the screen in which the Google web browser is executed, a second predetermined condition should be applied. Here, the second predetermined condition may be associated with at least one of a bending position, a bending region, a bending degree, a bending speed, a bending direction, and a bending duration.

In detail, in order for the control unit 180 to execute the first function by the first bending BE1, the first bending BE1 should be in a first bending state. Here, the first bending state may be set by a user or the like on the basis of at least one of the bending position, the bending region, the bending degree, the bending speed, the bending direction, and the bending duration.

However, the first bending state may be set variously depending on the electronic device to which the display 151 is applied, and may be preset by a manufacturer that manufactures the electronic device.

For example, when the bending state is set on the basis of the bending region, the control unit 180 may execute a different function depending on what part of the display 151 the first bending is made at. In FIG. 19, the execution of the first function may be a case in which the bending region is a region corresponding to the upper left corner of the display 151.

That is, when the first bending is made in the region corresponding to the upper left corner of the display 151, the first bending state for executing the first function is satisfied in terms of the bending region. Thus, the control unit 180 may execute the first function on the basis of a result of sensing the first bending BE1 by the bending sensing unit 146.

As another example, when the bending state is set on the basis of bending degree or bending speed, a function executed by the bending may vary depending on a level in which the bending degree is included among the plurality of levels classified according to the bending degree or the bending speed.

That is, in order for the control unit 180 to execute the first function by the first bending BE1, the first bending BE1 should reach the bending degree or the bending speed included in the level corresponding to the first function. In this case, the first bending BE1 may be determined to be in the first bending state.

As still another example, on a condition that the bending state is set on the basis of the bending direction, the first bending BE1 may be determined to be in the first bending state when the bending is made in a bending direction corresponding to the first function.

As still another example, on a condition that the bending state is set on the basis of the bending duration, the first bending BE1 may be determined to be in the first bending state when the bending is maintained for a time corresponding to the first function.

When the bending state is set on the basis of the bending position, the execution of the function by the bending may vary depending on the bending line or the bending region. When the first bending BE1 is made at the bending position corresponding to the first function, the first bending BE1 may be determined to be in the first bending state.

As described above, when the first bending BE1 satisfies the second predetermined condition, the control unit 180 may determine that the first bending BE1 may reach the first bending state, and may execute the first function (i.e., a downward scroll function in FIG. 19) on the basis of a first sensing result sensed by the bending sensing unit 146.

The bending sensing unit 146 may sequentially sense the first bending BE1 at a start point, an end point, and a return point of the first bending BE1. When the first bending BE1 reaches the first bending state, the control unit 180 may execute the first function (i.e., a downward scroll function in FIG. 19) based on the sensing result at that time, that is, the first sensing result.

A second function different from the first function may be implemented by a second bending BE2. As an example, as shown in FIG. 20, the second function may be an upward scroll function S2 for moving the screen upward while the Google web browser is executed.

The second bending BE2 may be a user's manipulation for executing the second function while the Google web browser is executed. As shown in FIG. 20, the second bending BE2 may denote that the display 151 is bent while an upper right corner of the display 151 is gripped with fingers or like, but is not limited thereto. Thus, the second bending BE2 may include folding or rolling.

The above-described principle of executing the first function by the first bending BE1 may be applied to the execution of the second function by the second bending BE2, and thus a detailed description thereof will be omitted.

When the first bending BE1 is sensed by the bending sensing unit 146, the control unit 180 determines whether the second bending BE2 satisfying the first predetermined condition has been sensed from the bending sensing unit 146 (S110).

Here, as an example, the first predetermined condition may be a condition that the second bending BE2 is started after the first bending BE1 is made, and before the first bending BE1 reaches the first bending state for executing the first function, and may include a condition that the first bending BE1 and the second bending BE2 are simultaneously made.

For example, the first predetermined condition may be a condition of a time difference between at least one of the start point and the end point of the first bending BE1 and at least one of the start point and the end point of the second bending BE2, and may be set variously.

As another example, on a condition that the first predetermined condition is 1 second, which is the condition of the time difference between the start points of the bendings, when the time difference between the start point of the first bending BE1 and the start point of the second bending BE2 is equal to or less than 1 second, the control unit 180 may determine that the second bending BE2 has satisfied the first predetermined condition.

As still another example, on a condition that the first predetermined condition is 1 second, which is the condition of the time difference between the return points of the bendings, when the time difference between the return point of the first bending BE1 and the return point of the second bending BE2 is equal to or less than 1 second, the control unit 180 may determine that the second bending BE2 has satisfied the first predetermined condition.

Here, the start point may be a point at which, after the bending is started by a user or the like, the bending sensing unit 146 senses that the bending is started, the end point may be a point at which the bending is made to a maximum after the bending is started, and the return point may be a point at which the bending is returned to the same as before the start point.

As still another example, the first predetermined condition may be achieved as a relation between at least one of a bending position, a bending region, a bending degree, a bending speed, a bending direction, and a bending duration of the first bending BE1 and at least one of a bending position, a bending region, a bending degree, a bending speed, a bending direction, and a bending duration of the second bending BE2.

That is, when the first predetermined condition is a condition about the bending position or region, in particular, when one bending position is the upper left corner of the display 151, and the other bending position is the upper right corner of the display 151, the control unit 180 may determine that the first predetermined condition is satisfied.

When the first predetermined condition is a condition about the bending degree, the bending speed, or the bending duration, the control unit 180 may determine that the first bending BE1 and the second bending BE2 correspond to a predetermined condition, and may determine whether the first predetermined condition is satisfied.

When the second bending itself is not sensed after the control unit 180 determines whether the second bending BE2 satisfying the first predetermined condition has been sensed from the bending sensing unit 146 (S110), the control unit 180 may execute the first function (i.e., a downward scroll function in FIG. 19) based on a first sensing result of sensing the first bending state in which the first bending BE1 is started and the first bending BE1 corresponds to the second predetermined condition (S130).

In addition, when the second bending BE2 is sensed from the bending sensing unit 146 but does not satisfy the first predetermined condition, the control unit 180 may execute the first function (i.e., the downward scroll function S1 in FIG. 19) based on the first sensing result of sensing the first bending state in which the first bending BE1 is started and the first bending BE1 corresponds to the second predetermined condition (S130), and may execute the second function (i.e., the upward scroll function S2 in FIG. 20) based on the second sensing result of sensing the second bending state in which the second bending BE2 is started and the second bending BE2 corresponds to the second predetermined condition (S130).

Here, a sequential relation between the execution of the first function and the execution of the second function by the control unit 180 may be determined by a sequential relation between the start points of the bendings, but is not limited thereto. The sequential relation may be determined differently depending on how the bending state is defined.

For example, when the bending state for the function execution is determined as the end time of the bending, the second function may be executed before the first function when the start point of the first bending BE1 is earlier than that of the second bending BE2, but the end point of the first bending BE1 is later than that of the second bending BE2.

When it is determined that the first bending BE1 and the second bending BE2 correspond to the first predetermined condition, the control unit 180 may execute a third function based on the first bending BE1 and the second bending BE2 that are sensed by the bending sensing unit 146 (S120).

For example, as shown in FIG. 21, when it is determined that the first bending BE1 and the second bending BE2 correspond to the first predetermined condition, the control unit 180 may execute the third function for capturing a screen (as represented by oblique lines in FIG. 21) while the Google web browser is executed.

Here, the control unit 180 may perform the third function, that is, capture the screen based on the first sensing result in which the first bending state of the first bending BE1 is sensed by the bending sensing unit 146 and the second sensing result in which the second bending state of the second bending state BE2 is sensed by the bending sensing unit 146, but is not limited thereto. The control unit 180 may perform the third function (that is, capture the screen) based on a sensing result corresponding to any point during which the first bending BE1 and the second bending BE2 are made.

When it is determined that the first bending BE1 and the second bending BE2 correspond to the first predetermined condition, the control unit 180 may not execute the first function corresponding to the first sensing result for the first bending BE1 and the second function corresponding to the second sensing result for the second bending BE2.

In other words, as shown in FIG. 21, when it is determined that the first bending BE1 and the second bending BE2 satisfy the first predetermined condition, the control unit 180 may not execute the downward scroll function S1 that is the first function caused by the first bending BE1 shown in FIG. 19 and the upward scroll function S2 that is the second function caused by the second bending BE2 shown in FIG. 20.

As shown in FIG. 22, the first bending BE1 and the second bending BE2 may be made by bending the entirety of one side of the display 151 and the entirety of the other side. Alternatively, the first bending BE1 and the second bending BE2 may be made in different bending directions.

In addition, it should be noted that various bending schemes may be applied to the first bending BE1 and the second bending BE2.

As described above, when the first bending BE1 and the second bending BE2 satisfy the first predetermined condition, the control unit 180 may execute the third function different from the first function caused by only the first bending BE1 and the second function caused by only the second bending BE2. Thus, the electronic device 100 according to the present invention may provide the user interface such that a user may easily control an operation corresponding to the bending, that is, the user's manipulation.

In addition, the control method of an electronic device according to the present invention may infinitely expand an application range by setting the first function, the second function, and the third function differently for each electronic device to which the display 151 is applied.

For example, when the screen displayed on the display 151 is a mail application or a text application, the first function and the second function may be set as a downward scroll and an upward scroll, respectively, and the third function may be set as a function associated with a screen capture function, a reply function, or a forwarding function.

In addition, when the screen displayed on the display 151 includes a plurality of web browsers, the first function and the second function may be set as a web browser conversion in one direction and a web browser conversion in the other direction, respectively, and the third function may also be set as a specific web browser closing function.

In addition, when the screen displayed on the display 151 is a TV screen, the first function and the second function may be set as a volume adjustment function, and the third function may also be set as screen capture, start recording, or end recording.

In addition, when the screen displayed on the display 151 is a screen that displays that a call is being connected, the first function and the second function may be set as the volume adjustment function, and the third function may also be set as call recording function.

In addition, when the screen displayed on the display 151 is a screen associated with a sound source application, the first function and the second function may be set as rewinding function and a fast forwarding function, respectively, and the third function may be set as a start point or an end point for cutting off the sound source.

In addition, when the screen displayed on the display 151 is a screen associated with a camera-associated application, the first function and the second function may be set as a focus adjustment function, and the third function may also be set as a mode conversion function, etc.

In addition, when the screen displayed on the display 151 include thumbnails or icons of a plurality of applications, the first function and the second function may be set as movement of a cursor or the like for selecting a specific application, and the third function may be set as a specific application selection function, a specific application activation function, or the like.

In addition, the first function and the second function may be set as a rotation function of the screen, and the third function may also be set as a screen locking function for maintaining an original orientation irrespective of rotation of the electronic device.

In addition, when the screen displayed on the display 151 is an electronic-book-associated application, the first function and the second function may be set as a screen enlargement function and a screen reduction function, and the third function may be set as a page change function.

It should be noted that the above-mentioned description is merely an example in which the control method of the electronic device according to the present invention may be applied, and may be variously changed according to the electronic device to which the flexible display 151 may be applied.

2. Method of Providing a Second User Interface

A second control method of an electronic device according to the present invention will be described below using the electronic device 100 that has been described with reference to FIGS. 1 to 16.

FIG. 24 is a flowchart for describing a second control method of an electronic device according to the present invention.

Referring to FIG. 24, another embodiment of a control method of an electronic device according to the present invention may include sensing a first bending BE1 (S200), determining whether a second bending satisfying a first predetermined condition is sensed (S210), ignoring the first bending BE1 according a result of the determination (S220) or executing a first function and/or a second function (S230).

Here, steps S200, S210, and S230 are the same as steps S100, S110, and S130 that have been described with reference to FIGS. 17 to 23, and a detailed description thereof will be omitted.

When the first bending BE1 is sensed by the bending sensing unit 146, the control unit 180 may determine whether the second bending BE2 satisfying the first predetermined condition is sensed from the bending sensing unit 146 (S210). When the determination result is that the first predetermined condition is satisfied, the control unit 180 may ignore the first bending BE1 sensed by the bending sensing unit 146 (S220).

As a result, though the bending sensing unit 146 senses the first bending BE1, and the first bending BE1 reaches the first bending state, the control unit 180 may not execute the first function.

The control unit 180 may not execute the first function by ignoring the first bending BE1, and may execute the second function based on the second sensing result of the second bending state by the bending sensing unit 146 with respect to the second bending BE2.

However, when the first bending BE1 is ignored, the control unit 180 may also ignore the second bending BE2. Thus, the control unit 180 may not execute the second function even when the bending sensing unit 146 senses the second bending BE2 and then the second bending BE2 reaches the second bending state.

In this case, the first bending BE1 and the second bending BE2 may be considered to be made unintentionally by the user for various reasons. Thus, the control unit 180 may determine that the bending is not the user's manipulation and thus may not execute any function.

However, it should be noted that the control unit 180 may determine the first bending BE1 and the second bending BE2 as a bending for executing the third function described with reference to FIGS. 17 to 23 and execute the third function.

3. Method of Providing a Third User Interface

A third control method of an electronic device according to the present invention will be described below using the electronic device 100 that has been described with reference to FIGS. 1 to 16.

FIG. 25 is a flowchart for describing a third control method of an electronic device according to the present invention.

Referring to FIG. 25, another embodiment of the third control method of an electronic device according to the present invention may include sensing a first bending BE1 (S300), determining whether a second bending BE2 satisfying a first predetermined condition is sensed (S310), ignoring the second bending BE2 according a result of the determination (S320) or executing a first function and/or a second function (S330).

Here, steps S300, S310, and S330 are the same as steps S100, S110, and S130 that have been described with reference to FIGS. 17 to 23, and a detailed description thereof will be omitted.

When the first bending BE1 is sensed by the bending sensing unit 146, the control unit 180 may determine whether the second bending BE2 satisfying the first predetermined condition is sensed from the bending sensing unit 146 (S310). When the determination result is that the first predetermined condition is satisfied, the control unit 180 may ignore the second bending BE2 sensed by the bending sensing unit 146 (S320).

As a result, though the bending sensing unit 146 senses the second bending BE2, and the second bending BE2 reaches the second bending state, the control unit 180 may not execute the second function.

The control unit 180 may not execute the first function by ignoring the second bending BE2. However, the control unit 180 may execute the second function based on the second sensing result of the second bending state by the bending sensing unit 146 with respect to the second bending BE2.

However, when the second bending BE2 is ignored, the control unit 180 may also ignore the first bending BE1. Thus, the control unit 180 may not execute the first function even when the bending sensing unit 146 senses the first bending BE1 and then the first bending BE1 reaches the first bending state.

In this case, the first bending BE1 and the second bending BE2 may be considered to be made unintentionally by the user for various reasons. Thus, the control unit 180 may determine that the bending is not the user's manipulation and thus may not execute any function.

However, it should be noted that the control unit 180 may determine the first bending BE1 and the second bending BE2 as a bending for executing the third function described with reference to FIGS. 17 to 23 and execute the third function.

4. Method of Providing a Fourth User Interface

FIG. 26 is a flowchart for describing a fourth control method of an electronic device according to the present invention, and FIGS. 27 to 30 are diagrams for describing the fourth control method of an electronic device according to the present invention.

Referring to FIG. 29, the fourth control method of an electronic device according to the present invention may include displaying a screen in which a first function is executed (S400), sensing at least one bending (S410), acquiring a sensing result of the bending (S420), determining whether the bending satisfies a predetermined condition (S430), and releasing the first function (S440) or maintaining the first function (S450) according to a result of the determination.

Here, the sensing of at least one bending may be performed by the bending sensing unit 146. The bending sensing unit 146 may include the bending sensor 146 including the bend sensor that has been described with reference to FIGS. 16 to 25, but is not limited thereto. The bending sensing unit 146 may also use various sensors.

However, in the following description, the bending sensing unit 146 and the bending sensor 146 will use the same reference number.

The steps will be described below in detail with reference to FIGS. 27 to 30.

First, the electronic device 100 according to the present invention may sense at least one bending through the bending sensing unit 146 and may recognize the at least one bending as a user's manipulation for executing a function and execute the function on the basis of a result of the sensing. The function executed when the bending is recognized as the user's manipulation may vary depending on an electronic device with which the flexible display 151 is implemented.

For example, when the flexible display 151 is applied to a cellular phone, the electronic device 100 may perform an operation corresponding to a user's manipulation among various operations such as call connection, reception refusal, menu display, text transmission and reception, application selection and execution, and web browser execution and completion. As another example, when the flexible display 151 is applied to a TV, the electronic device 100 may perform an operation corresponding to a user's manipulation among various operations such as channel selection, volume adjustment, brightness adjustment, color adjustment, and contrast adjustment. In addition, the flexible display 151 may be implemented as various types of display devices such as a PDA, an electronic photo frame, an electronic book, an electronic notebook, an MP3 player, a tablet PC, a laptop computer, or a monitor and may perform various operations suitable for the devices. Further, the flexible display 151 may perform general operations such as a locking operation, an unlocking operation, a turn-on operation, or a turn-off operation regardless of the type of the electronic device to which the flexible display 151 is applied.

In addition, the operation corresponding to the user's manipulation may be implemented variously depending on an application performed by the electronic device to which the flexible display 151 is applied. That is, the flexible display 151 may perform a function corresponding to the user's function among functions supported by the application. As an example, when an electronic book application is executed, the flexible display device 100 may perform an operation according to a function corresponding to the user's manipulation among various functions such as content conversion, page changing, enlargement, reduction, and bookmarking.

An example in which an unlocking function is executed by the at least one bending sensed by the bending sensing unit 146 irrespective of the type of the electronic device to which the flexible display 151 is applied will be described below.

As shown in FIG. 27, the control unit 180 may display a screen SC in which the first function is executed on the flexible display 151 (hereinafter, referred to as a display) (S400).

Here, the screen SC may be a screen for a specific application that is selected according to a user's input and/or a specific event that occurred in the electronic device 100. However, FIG. 18 shows, as an example, that the screen SC displaying a lock state is being displayed on the display 151.

In this case, the first function may be the locking function.

Here, the electronic device to which the flexible display 151 is applied may generally include a locking function, and various methods may be applied to release the locking function.

As an example, an electronic device to which the flexible display 151 is applied may be set in any combination of reference bending states of at least any one or more bendings in order to release the lock. FIG. 19 shows an electronic device for which an unlocking function is set in a combination of reference bending states of the at least any one or more bendings, that is, four bendings that are a first bending BE1, a second bending BE2, a third bending BE3, and a fourth bending BE4.

Here, the reference bending state is a bending state in which, after any bending is started, the control unit 180 may determine the bending as the user's manipulation for executing any function and may be a predetermined bending state for the bending.

The reference bending state may be set variously depending on the electronic device to which the display 151 is applied, and may be preset variously by a manufacturer that manufactures the electronic device.

In other words, in order for the control unit 180 to execute any function by a bending, the bending reaches the reference bending state and thus the bending should be determined to correspond to the user's manipulation by the control unit 180. The reference bending state may be set based on at least one of the bending position, the bending region, the bending degree, the bending speed, the bending direction, and the bending duration, or may be set based on at least one of a start point (a point at which, after the bending is started by the user or the like, the bending sensing unit 146 senses that the bending has been started), an end point (a point at which the bending is made to the maximum after the bending is started), and a return point (a point at which the bending is returned to the same as before the bending is started) with respect to the bending time.

For example, when the reference bending state is set based on the bending region, the bending region may be different depending on which part of the display 151 is bent. Thus, the control unit 180 may determine the bending as the user's manipulation for executing a different function depending on the bending region. When the reference bending state is set on the basis of the bending degree or the bending speed, a function executed by the bending may vary depending on a level in which the bending degree is included among a plurality of levels classified according to the bending degree or the bending speed.

That is, in order for the control unit 180 to execute any function by a bending, the bending should reach the bending degree or the bending speed included in the level corresponding to the function. In this case, the bending may be determined to be in the reference bending state.

As still another example, on a condition that the reference bending state is set based on the bending direction, a bending may be determined to be in the reference bending state when the bending is made in a bending direction corresponding to any function.

As still another example, on a condition that the reference bending state is set based on the bending duration, a bending may be determined to be in the reference bending state when the bending is maintained for a time corresponding to any function.

When the reference bending state is set based on the bending position, the execution of the function by the bending may vary depending on the bending line or the bending region. When the bending is made at the bending position corresponding to any function, the bending may be determined to be in the reference bending state.

As shown in FIG. 27, an electronic device which has the control unit 180 that sets the reference bending state, that is, a bending state that may be determined as the user's manipulation for executing any function, to a bending region, and which is unlocked when the bending region is implemented in a combination of a first region R1, a second region R2, a third region R3, and a fourth region R4 irrespective of their order will be described as an example below.

In other words, as shown in FIG. 28, a lock releasing principle will be described, as an example, using an electronic device that is unlocked when at least one or more bendings BE1 to BE4 are made and then the bending states of the bendings BE1 to BE4, that is, bending regions of the bendings BE1 to BE4 satisfy the first region R1 to the fourth region RE4 irrespective of their order to correspond to the reference bending state.

Referring to FIGS. 27 and 28, the electronic device 100 may set a case in which the bending region corresponds to the first region R1 to the fourth region R4 as a predetermined condition for the control unit 180 to execute a lock releasing function (changing the function).

In FIG. 27, when the first bending BE1 to the fourth bending BE4 are made in the vicinity of the first region R1 to the fourth region R4, as shown in FIG. 19, and in particular, when the bending region of the first bending BE1 becomes the first region R1, the bending region of the second bending BE2 becomes the second region R2, the bending region of the third bending BE3 becomes the third region R3, and the bending region of the fourth bending BE4 becomes the fourth region R4, the control unit 180 may determine the bending states of the first bending BE1 to the fourth bending BE4 correspond to the reference bending state, that is, determine that the bending states satisfy the predetermined condition (S430) and release the first function (S440), that is, the lock may be released.

Here, the first bending BE1 to the fourth bending BE4 should reach the reference bending state irrespective of their order. In order words, the bending should be made to reach the reference bending state until the bending regions become the first region R1 to the fourth region F4 irrespective of their order. Even though any one bending is sensed by the bending sensing unit 146 to satisfy the bending region condition to reach the reference bending state when another bending is not sensed by the bending sensing unit 146 during a predetermined time, or when it is determined that the bending region condition of the other bending is not satisfied during the predetermine time, the first bending BE1 to the fourth bending BE4 are not determined as a bending for releasing the lock.

FIG. 29 shows an electronic device in which, when the reference bending state is set as the bending region, and the bending region of the bending sequentially becomes the first region R1 (see FIG. 27), the second region R2 (see FIG. 27), the third region R3 (see FIG. 27), and the fourth region R4 (see FIG. 27), the bending is set as a signal for executing the lock releasing function.

In other words, FIG. 29 shows an electronic device in which, when a bending region of a first bending BE1' becomes the first region R1 to reach the reference bending state, a bending region of a second bending BE2' becomes the second region R2 to reach the reference bending state, a bending region of a third bending BE3' becomes the third region R3 to reach the reference bending state, and a bending region of a fourth bending BE4' becomes the fourth region R4 to reach the reference bending state, the first bending BE1' to the fourth bending BE4' may execute a lock releasing function by the control unit 180.

FIG. 30 is a diagram showing the order of operations for releasing the lock of the electronic device shown in FIG. 29. FIG. 30A shows the display 151 that displays the screen SC in which the first function (that is, locking) is executed by the control unit 180.

The bending sensing unit 146 senses at least one or more bendings BE1 to BE4 of the display 151 (S410), and the control unit 180 acquires a sensing result of the bendings BE1 to BE4 (S420). A detailed description thereof is as follows.

First, a user executes the first bending BE1 to release a locking function. In this case, the bending sensing unit 146 senses the first bending BE1, and the control unit 180 determines whether the sensing result acquired from the bending sensing unit 146, that is, the bending region indicating the bending state of the first bending BE1 corresponds to the first region R1.

As a result, the control unit 180 determines whether the bending region among the bending states of the first bending BE1 reaches the reference bending state of becoming the first region R1.

Subsequently, the second bending BE2, the third bending BE3, and the fourth bending BE4 are executed as shown in FIGS. 30B to 30D, respectively. The bending sensing unit 146 senses the second bending BE2 to the fourth bending BE4, and the control unit 180 determines that each bending reaches the reference bending state, like the first bending BE1.

The above-described determination of the control unit 180 is for determining that the acquired sensing result corresponds to the predetermined condition for changing a function (S430) after acquiring the sensing result of the first bending BE1 to the fourth bending BE4 from the bending sensing unit 146 through step S420.

Here, the predetermined condition for changing a function is a criterion for the control unit 180 to determine whether the acquired sensing result is a bending executed to release the lock in order to release the first function, that is, execute the lock releasing function, and may be a condition that the first region R1, the second region R2, the third region R3, and the fourth region R4 sequentially become the bending region, as shown in FIG. 30.

As a result of the determination, when the control unit 180 determines that the acquired sensing result corresponds to the predetermined condition for changing a function, the control unit may release the first function, that is, release the lock (S440) based on the determination. In detail, when the bending regions for the bending are sequentially implemented as the first region R1 to the fourth region R4, the control unit 180 may sequentially release the first function, that is, release the lock (S440) (see FIG. 30D).

Here, the predetermined condition for changing a function, which is a condition that the bending regions for the bending sequentially become the first region R1 to the fourth region R4, may be variously changed. For example, the predetermined condition may be the condition that the bending region sequentially becomes the first region R1, the second region R2, the first region R1, the third region R3, and the fourth region R4.

In this case, in order for the number of times the bending region becomes the first region R1 to be two, the bending for allowing the bending region to be the first region R1 may be performed twice. As a result, when the same region is set as the bending region several times, any one bending may be performed several times.

In addition, the predetermined condition for changing a function may be the condition that the bending region of the bending sequentially becomes the first region R1, the first region R1, the second region R2, the third region R3, and the fourth region R4.

In this case, in order for the bending region to repeatedly become the first region R1, the bending for allowing the bending region to be the first region R1 may be performed twice in sequence. As a result, when the same region is sequentially set as the bending region, any one bending may be repeated.

When that determination result is that the acquired sensing result does not correspond to a predetermined condition including a combination condition of the reference bending states that denote a combination of the bending regions, the control unit 180 may maintain the first function (i.e., a locking state).

In other words, when it is determined that at least one or more bending regions among the first bending BE1 to the fourth bending BE4 are not implemented as the first region R1 to the fourth region R4, the control unit 180 maintains the first function and does not release the lock (S450).

In addition, although the control unit 180 determines that the bending region of the first bending BE1, that is the sensing result, becomes the first region R1 and reaches the reference bending state after the first bending BE1 is sensed by the bending sensing unit 146, the control unit 180 may determine that the sensing result of the first bending BE1 and the second bending B2 does not correspond to the predetermined condition for changing a function and maintain the locking function that is the first function when the second bending BE2 is not sensed by the bending sensing unit 146 within a predetermined time, or when the second bending BE2 is sensed by the bending sensing unit 146 within the predetermined time but it is determined that the bending region of the second bending BE2 does not reach the reference bending state of becoming the second region R2.

This may be also applied to the third bending BE3 and the fourth bending BE4.

Although the first bending BE1 to the fourth bending BE4 are not sequentially made, the control unit 180 may determine that the predetermined condition for changing a function is satisfied when the order of the bending regions is sequentially from the first region R1 to the fourth region R4. In this case, the control unit may release the locking function that is the first function.

The predetermined condition for a changing function may be a condition including the bending region that has been described above, but is not limited thereto. The predetermined condition may be variously changed by the user. That is, the electronic device 100 may be manufactured such that the predetermined condition may be changed.

For example, the predetermined condition for changing a function may be a condition including at least one of a bending position condition, a bending degree condition, a bending speed condition, a bending direction condition, a bending duration condition, and a bending number condition. In addition, the predetermined condition may be a condition including at least one of a start point condition of the bending, an end point condition of the bending, and a return point condition of the bending.

In detail, on a condition that the predetermined condition for changing functions includes a condition associated with a start point of the bending or, in other words, on a condition that the locking function that is the first function is released when a time difference between the start points of the bendings is implemented within a predetermined time (e.g., 1 second), which is set by a user or upon fabrication, the control unit 180 may determine that the bendings are sequentially made by the user or the like. When the time difference (e.g., within 1 second) between the start points is implemented within the predetermined time (e.g., within 1 second), the control unit 180 may release the locking function that is the first function.

As another example, when the predetermined condition for changing a function includes a condition associated with a duration time of the bending or when at least one or more bending durations (e.g., within 1 second) satisfy the predetermined duration condition (e.g., 1 second), the control unit 180 may determine that the bending is made within the predetermined time (e.g., 1 second) by the user or the like, and may release the locking function that is the first function.

As still another example, when the predetermined condition for changing a function includes a condition about the bending degree, the bending speed, or the bending direction, the control unit 180 may determine that the bending made by the user or the like satisfies the predetermined bending degree, bending speed, or bending condition and release the locking function that is the first function.

FIGS. 31 to 34 are other diagrams for describing the fourth control method of an electronic device according to the present invention.

The locking function that is the first function of the electronic device 100 may be implemented by the bending that satisfies any combination of a numerical or alphabetical keypad displayed on the display 151. For example, as shown in FIGS. 31 to 34, when numbers 1, 2, 3, and 4 are sequentially touched while the numerical keypad is displayed on the display 151, the control unit 180 may release the locking function.

It will be appreciated that, when numbers 1, 2, 3, and 4 are sequentially touched with a finger in order to release the locking function, the control unit 180 may release the locking function. However, the sequential touches of numbers 1, 2, 3, and 4 may be replaced with the bending.

For example, the user or the like may preset the bending corresponding to the user's manipulation that indicates a touch of number 1 as a case in which a region corresponding to an upper left corner of the display 151 is bent and the bending region becomes the first region R1 (see FIG. 27), may preset the bending corresponding to the user's manipulation that indicates a touch of number 2 as a case in which a region corresponding to an upper right corner of the display 151 is bent and the bending region becomes the second region R2 (see FIG. 27), may present the bending corresponding to the user's manipulation that indicates a touch of number 3 as a case in which a region corresponding to a lower left corner of the display 151 is bent and the bending region becomes the third region R3 (see FIG. 27), and may preset the bending corresponding to the user's manipulation that indicates a touch of number 4 as a case in which a region corresponding to a lower right corner of the display 151 is bent and the bending region becomes the fourth region R4 (see FIG. 27).

That is, the predetermined condition for releasing the locking function that is the first function may be a condition that the first region R1, the second region R2, the third region R3, and the fourth region R4 sequentially become the bending region.

FIGS. 31 to 34 are diagrams for describing the order of operations for releasing the lock. FIG. 31 shows that the numerical keypad is displayed on the display 151 while the first function that is the locking is executed by the control unit 180 through step S400.

The bending sensing unit 146 may sense at least one or more bendings BE1 to BE4 of the display 151 (S410), and the control unit 180 may acquire a sensing result of the bendings BE1 to BE4 (S420).

First, as shown in FIG. 31, a user executes the first bending BE1 to release a locking function. In this case, the bending sensing unit 146 senses the first bending BE1, and the control unit 180 determines whether the sensing result acquired from the bending sensing unit 146, that is the bending region indicating the bending state of the first bending BE1, corresponds to the first region R1 corresponding to the user's manipulation indicating a touch of the number 1 of the numerical keypad.

As a result, the control unit 180 determines whether the bending region among the bending state of the first bending BE1 reaches the reference bending state of becoming the first region R1.

Here, the reference bending state has already been described in the above embodiment, and a detailed description thereof will be omitted.

When the control unit 180 determines that the bending region of the first bending BE1 corresponds to the first region R1, the control unit 180 may display the same indication as a case in which the number 1 of the numerical keypad is touched to enable the user to perform identification, but is not limited thereto.

When the control unit 180 determines that number 1 is touched by the first bending BE1, as shown in FIG. 32, the user executes the second bending BE2. When the control unit 180 determines that the number 2 is touched according to the same principle, as shown in FIGS. 33 and 34, the user executes the third bending BE3 and the fourth bending BE4. Finally, when the first bending BE1 to the fourth bending BE4 satisfy the predetermined condition, the control unit 180 releases the locking function that is the first function.

After it is determined that the number 1 is touched by the first bending BE1, the control unit 180 may determine whether each of the second bending BE2, the third bending BE3, and the fourth bending BE4 corresponds to a region corresponding to a user's manipulation indicating a touch of any one of the numerical keypad, but is not limited thereto. As long as the bending region of the bending is implemented in the sequence of the first region R1 to the fourth region R4 irrespective of the bending order, the control unit 180 may release the first function, that is, release the lock.

The locking function that is the first function of the electronic device 100 may be implemented by the bending satisfying any combination irrespective of the order of the numerical or alphanumeric keypad displayed on the display 151. In this case, when the bending region of the bending finally satisfies only the first region R1 to the fourth region R4 irrespective of the order, the control unit 180 may release the locking that is the first function.

The predetermined condition for changing a function, that is, a bending condition corresponding to the user's manipulation indicating a touch of any one of the numerical keypad is not limited to the bending region, and may be a condition including at least one of a bending position condition, a bending degree condition, a bending speed condition, a bending direction condition, a bending duration condition, and a bending number condition. In addition, the predetermined condition may be a condition including at least one of a start point condition of the bending, an end point condition of the bending, and a return point condition of the bending.

Accordingly, a detailed description thereof will be omitted.

FIGS. 35 to 39 are still other diagrams for describing the forth control method of an electronic device according to the present invention.

The locking function that is the first function of the electronic device 100 may be implemented by the bending that satisfies any pattern condition on the keypad displayed on the display 151. For example, when the pattern of the keypad is touched and dragged as shown in FIG. 35 such that a first pattern P1 to a fourth pattern P4 are successive, the control unit 180 may release the locking function.

It will be appreciated that the lock function may be released by the control unit 180 by forming a touch and drag pattern with a finger or the like in order to release the locking function. However, the formation of the pattern may be replaced with the bending.

For example, the user or the like may preset the bending corresponding to the user's manipulation that indicates the formation of the first pattern P1 as shown in FIG. 36 as a case in which a region corresponding to an upper left corner of the display 151 is bent and the bending region is implemented as the first region R1 (see FIG. 27), may preset the bending corresponding to the user's manipulation that indicates the formation of the second pattern P2 as shown in FIG. 37 as a case in which a region corresponding to an upper right corner of the display 151 is bent and the bending region is implemented as the second region R2 (see FIG. 27), may preset the bending corresponding to the user's manipulation that indicates the formation of the third pattern P3 as shown in FIG. 38 as a case in which a region corresponding to a lower left corner of the display 151 is bent and the bending region is implemented as the third region R3 (see FIG. 27), and may preset the bending corresponding to the user's manipulation that indicates the formation of the fourth pattern P4 as shown in FIG. 39 as a case in which a region corresponding to an upper right corner of the display 151 is bent and the bending region is implemented as the fourth region R4 (see FIG. 27).

That is, the predetermined condition for releasing the locking function that is the first function may be a condition that the first region R1, the second region R2, the third region R3, and the fourth region R4 sequentially become the bending region.

When the control unit 180 determines that the bending region of the first bending BE1 corresponds to the first region R1, the control unit 180 may display a pattern on the keypad to enable the user to identify the pattern as shown in FIG. 38, but is not limited thereto.

When the control unit 180 determines that the first pattern P1 is formed by the first bending BE1, as shown in FIG. 37, the user executes the second bending BE2. When the control unit 180 determines that the second pattern P2 is formed according to the same principle, as shown in FIGS. 38 and 39, the user executes the third bending BE3 and the fourth bending BE4. Finally, when the control unit 180 determines that the third pattern P3 and the fourth pattern P4 are formed, the first bending BE1 to the fourth bending BE4 satisfy the predetermined condition, and thus the control unit 180 releases the locking function that is the first function.

The predetermined condition for changing a function, that is, a bending condition corresponding to the user's manipulation indicating a touch of any one of the numerical keypad is not limited to the bending region, and may be a condition including at least one of a bending position condition, a bending degree condition, a bending speed condition, a bending direction condition, a bending duration condition, and a bending number condition. In addition, the predetermined condition may be a condition including at least one of a start point condition of the bending, an end point condition of the bending, and a return point condition of the bending.

Accordingly, a detailed description thereof will be omitted.

5. Method of Providing a Fifth User Interface

FIG. 40 is a flowchart for describing a fifth control method of an electronic device according to the present invention, and FIGS. 41 and 42 are diagrams for describing the fifth control method of an electronic device according to the present invention.

Referring to FIG. 40, the fifth control method of an electronic device according to the present invention may include displaying a screen in which a first function is executed (S500), sensing at least one bending (S510), acquiring a sensing result of the bending (S520), determining whether the bending satisfies a predetermined condition (S530), and executing a second function (S540) or maintaining the first function (S550) according to a result of the determination.

The steps will be described below in detail with reference to FIGS. 41 and 42.

As shown in FIG. 41, the control unit 180 may display a screen SC in which the first function is executed on the display 151 (S500).

Here, the screen may be a screen for a specific application that is selected according to a user's input and/or a specific event that occurred in the electronic device 100. FIG. 32 shows, as an example, that a screen, in which an application A that is the first function is executed, is displayed on the display 151.

The electronic device may execute an application B that is the second function based on at least one or more bendings while the application A that is the first function is executed.

In detail, in order to execute the second function while the first function is executed, an electronic device to which the display 151 is applied may be set in any combination of reference bending states of at least any one or more bendings. FIG. 32 shows an electronic device in which the second function may be executed when the bending region is implemented in a combination of a first region R1 and a second region R2 irrespective of the order or in sequence.

Here, the reference bending state has been described in the above embodiment and thus will be omitted in the following description.

When the reference bending state is set as the bending region, that is, when the bending region of the bending sequentially becomes the first region R1 and the second region R2, the control unit 180 may execute the second function. In detail, FIG. 42 shows that a first bending BE1 and a second bending BE2 execute the second function by the control unit 180 when the bending region for the first bending BE1 becomes the first region R1 to reach the reference bending state and the bending region for the second bending BE2 becomes the second region R2 to reach the reference bending state.

The bending sensing unit 146 senses at least one or more bendings BE1 and BE2 of the display 151 (S510). The control unit 180 acquires a sensing result of the bendings BE1 and BE2 (S520), determines whether the sensing result satisfies the predetermined condition for changing a function, that is, a condition that the bending regions for the bendings become the first region R1 and the second region R2 irrespective of the order or in sequence (S530), executes the second function when it is determined that the predetermined condition is satisfied (S540), and maintains the first function when it is determined that the predetermined condition is not satisfied (S550).

The predetermined condition for changing a function may be a condition including the bending region that has been described above, but is not limited thereto. The predetermined condition may be variously changed by the user. That is, the electronic device 100 may be manufactured such that the predetermined condition may be changed.

For example, the predetermined condition for changing a function may be a condition including at least one of a bending position condition, a bending degree condition, a bending speed condition, a bending direction condition, a bending duration condition, and a bending number condition. In addition, the predetermined condition may be a condition including at least one of a start point condition of the bending, an end point condition of the bending, and a return point condition of the bending.

In addition, when a predetermined condition is satisfied, the control unit 180 has the same configuration and effect as described in the above embodiment, except that the second function is executed, and a detailed description thereof will be omitted.

The first function and the second function described in the embodiment are not limited to the execution of the application A and the execution of the application B, and may be variously changed.

For example, the first function may be any web browser executing function, and the second function may be any web browser closing function.

As another example, the first function may be a mail, text, or web browser execution function, and the second function may be a function such as screen capture, reply, and forwarding.

As still another example, when an electronic device to which the display 151 is applied is a TV, the first function may be a screen playback function, and the second function may be a function such as screen capture, setting of the start time of recording, or setting of the end time of recording.

In addition, it should be noted that the first function and the second function may correspond to various operations depending on the electronic device to which the flexible display 151 is applied.

In the above-described control method of an electronic device, the steps of each embodiment are not necessary, and thus the embodiment may selectively include the above-described steps. The steps of each embodiment do not need to be performed in the described order. Steps described later may be performed before steps described earlier.

Each embodiment of the control method of an electronic device according to the present invention is not limited to being implemented independently. Two or more embodiments may be implemented at the same time.

The control method of an electronic device according to the present invention may be implemented in the form of a code or program that performs the control method. Such a code or program may be stored in a computer-readable recording medium.

It will be apparent to those skilled in the art that various substitutions, modifications, and changes may be made thereto without departing from the scope and spirit of the present invention. The present invention is not limited by the embodiments and drawings described herein. However, the embodiments described herein may not be limitedly applied, and various modifications to the embodiments may be made by selectively combining all or some of the embodiments. Furthermore, the steps of each embodiment may be used separately from or in combination with steps of another embodiment.

In addition, the present invention has been described using the first bending BE1 and the second bending BE2 as a bending for executing the third function, but is not limited thereto. The third bending to an N-th bending (N is a natural number) may also be used. In addition, the bending scheme can be variously changed.

What is claimed is:

1. An electronic device comprising:
    a flexible display;
    one or more bending sensors coupled to the flexible display and configured to generate signals in response to a first bending at a first portion of the flexible display and a second bending at a second portion of the flexible display; and
    a controller connected to the one or more bending sensors and comprising at least one processor to process the signals for controlling operation of the electronic device,
    wherein the controller is configured to activate a first function of the electronic device when the first bending is sensed and reaches a first predetermined bending state for activating the first function and the controller is further configured to activate a second function of the electronic device when the second bending is sensed and reaches a second predetermined bending state for activating the second function,
    wherein, in response to the second bending sensed while the first bending is occurring, the controller is configured to:
        activate a third function different from the first and second functions while not activating the first and second functions, when (1) the second bending is sensed before the first function is activated and (2) the first bending and the second bending satisfy a predetermined condition, and
        activate the first function, when (3) the second bending is sensed before the first function is activated and (4) the second bending is released while the first bending is still occurring, activate the first function.

2. The electronic device of claim 1, wherein the controller is configured to activate the third function based on a time difference between at least one of a start point and an end point of the first bending and at least one of a start point and an end point of the second bending.

3. The electronic device of claim 1, wherein the controller is configured to activate the third function based on a time difference between a return time of the first bending and a return time of the second bending.

4. The electronic device of claim 1, wherein the controller is configured to activate the third function based on a relation between at least one of a bending position, a bending region, a bending degree, a bending speed, a bending direction, and a bending duration of the first bending and at least one of a bending position, a bending region, a bending degree, a bending speed, a bending direction, and a bending duration of the second bending.

5. The electronic device of claim 1, wherein the controller is configured to activate the first function based on at least one of a bending position, a bending region, a bending degree, a bending speed, a bending direction, and a bending duration of the first bending.

6. The electronic device of claim 1,
    wherein the controller is configured to activate the second function based on at least one of a bending position, a bending region, a bending degree, a bending speed, a bending direction, and a bending duration of the second bending.

7. The electronic device of claim 1, wherein the first function comprises a first operation to set a function on the electronic device to which the flexible display is applied, the second function comprises a second operation to adjust the function and the third function comprises a third operation to reset the function.

8. The electronic device of claim 7, wherein the first operation comprises a scroll up operation of a screen of the flexible display, the second operation comprises scroll down operation of the screen and the third operation comprises resetting the screen.

9. The electronic device of claim 7, wherein each of the first function, the second function and the third function further comprises at least one of content conversion, page changing, bookmarking, scroll, screen capture, web browser conversion, web browser closing, volume adjustment, recording, rewinding, fast forwarding, setting sound source, focus adjustment, mode conversion, selecting an application, activating an application, rotating a screen, or screen locking.

* * * * *